United States Patent
Nam et al.

(10) Patent No.: US 9,178,583 B2
(45) Date of Patent: Nov. 3, 2015

(54) CHANNEL STATE INFORMATION FEEDBACK DESIGN IN ADVANCED WIRELESS COMMUNICATION SYSTEMS

(71) Applicant: Samsung Electronics Co., Ltd., Suwon-si, Gyeonggi-do (KR)

(72) Inventors: Young-Han Nam, Plano, TX (US); Yang Li, Plano, TX (US); Boon Loong Ng, Dallas, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/149,436

(22) Filed: Jan. 7, 2014

(65) Prior Publication Data
US 2014/0192917 A1    Jul. 10, 2014

Related U.S. Application Data

(60) Provisional application No. 61/750,223, filed on Jan. 8, 2013, provisional application No. 61/841,066, filed on Jun. 28, 2013.

(51) Int. Cl.
*H04B 7/02*    (2006.01)
*H04B 7/04*    (2006.01)
*H04B 7/06*    (2006.01)

(52) U.S. Cl.
CPC ............ *H04B 7/0417* (2013.01); *H04B 7/0632* (2013.01); *H04B 7/063* (2013.01); *H04B 7/0639* (2013.01)

(58) Field of Classification Search
CPC .... H04B 7/0417; H04B 7/0632; H04B 7/063; H04B 7/0639
USPC .......................................................... 375/267
See application file for complete search history.

(56) References Cited

U.S. PATENT DOCUMENTS

| | | | |
|---|---|---|---|
| 2010/0272040 A1 | 10/2010 | Nam et al. | |
| 2010/0322176 A1* | 12/2010 | Chen et al. | 370/329 |
| 2011/0141987 A1* | 6/2011 | Nam et al. | 370/329 |
| 2011/0249643 A1* | 10/2011 | Barbieri et al. | 370/329 |
| 2012/0140694 A1 | 6/2012 | Sun et al. | |
| 2012/0176939 A1* | 7/2012 | Qu et al. | 370/255 |
| 2012/0250549 A1* | 10/2012 | Lee et al. | 370/252 |
| 2012/0320783 A1 | 12/2012 | Wu et al. | |
| 2013/0003788 A1* | 1/2013 | Marinier et al. | 375/219 |

(Continued)

OTHER PUBLICATIONS

International Search Report dated Apr. 22, 2014 in connection with International Patent Application No. PCT/KR2014/000219, 3 pages.

(Continued)

*Primary Examiner* — Juan A Torres

(57) ABSTRACT

Methods and apparatuses for providing feedback by a UE. A method includes receiving a first set of CSI-RS and a second set of CSI-RS, calculating a CQI using a received power of the first set of CSI-RS and a channel matrix estimated based on the second set of CSI-RS, and sending feedback based on the calculated CQI. A method includes measuring signals received on a plurality of CSI-RS ports; calculating CQI values for each of applications of precoding matrixes to each of the selected combinations of CSI-RS ports; selecting a SPN, a SPI, a PMI, and a RI that yields a highest CQI from among the calculated CQI values; and sending feedback indicating the SPI, the highest CQI value, the PMI, and at least one of the SPN or the RI.

16 Claims, 13 Drawing Sheets

(56) References Cited

U.S. PATENT DOCUMENTS

| | | | |
|---|---|---|---|
| 2013/0258874 A1* | 10/2013 | Khoshnevis et al. | 370/252 |
| 2013/0286884 A1* | 10/2013 | Li et al. | 370/252 |
| 2013/0303219 A1* | 11/2013 | Acharya et al. | 455/509 |
| 2014/0016549 A1* | 1/2014 | Novlan et al. | 370/328 |
| 2014/0036664 A1* | 2/2014 | Han et al. | 370/230 |
| 2014/0064109 A1* | 3/2014 | Krishnamurthy | 370/252 |
| 2014/0078919 A1* | 3/2014 | Hammarwall | 370/252 |
| 2014/0098689 A1* | 4/2014 | Lee et al. | 370/252 |
| 2014/0200001 A1* | 7/2014 | Song et al. | 455/436 |
| 2014/0334391 A1* | 11/2014 | Khoshnevis et al. | 370/329 |

OTHER PUBLICATIONS

Written Opinion of International Searching Authority dated Apr. 22, 2014 in connection with International Patent Application No. PCT/KR2014/000219, 6 pages.

3GPP TS 36.212 V11.1.0; "Technical Specification Group Radio Access Network; Evolved Universal Terrestrial Radio Access (E-UTRA); Multiplexing and channel coding"; Release 11; Dec. 2012; 82 pages.

* cited by examiner

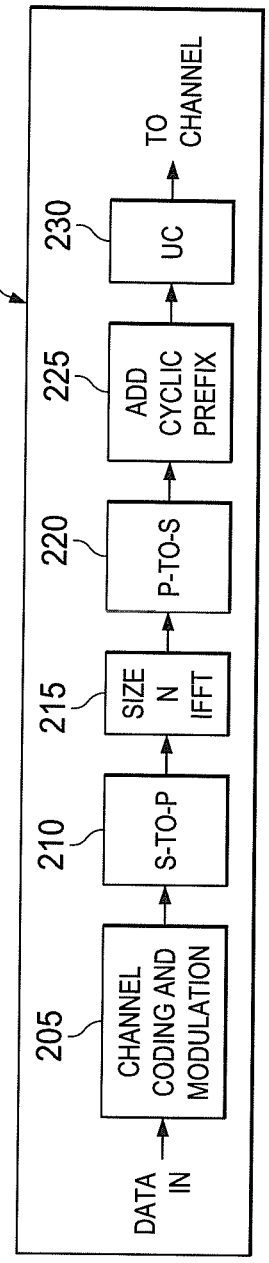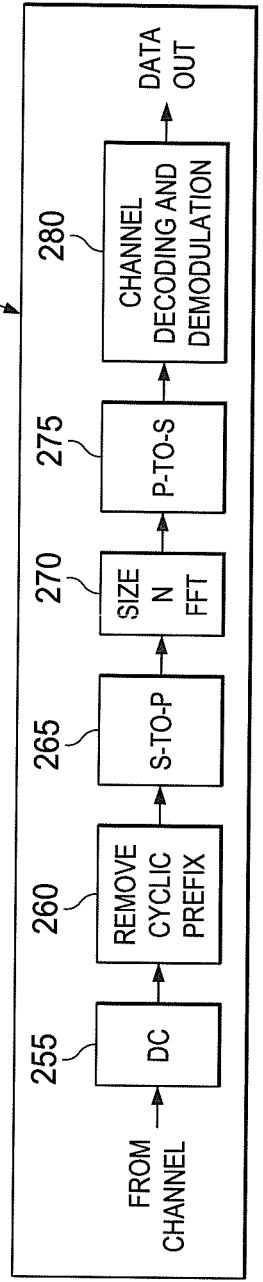

CHANNEL STATE INFORMATION FEEDBACK DESIGN IN ADVANCED WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 61/750,223, filed Jan. 8, 2013, entitled "Channel State Information Feedback in Advanced Wireless Communication Systems" and U.S. Provisional Patent Application Ser. No. 61/841,066, filed Jun. 28, 2013, entitled "Channel State Information Feedback Design in Advanced Wireless Communication Systems." The content of the above-identified patent documents is incorporated herein by reference.

TECHNICAL FIELD

The present application relates generally to channel state information and, more specifically, to feedback design of channel state information and to the corresponding downlink configuration design in advanced wireless communication systems.

BACKGROUND

The following documents and standards descriptions are hereby incorporated into the present disclosure as if fully set forth herein: 1) 3GPP TS 36.211 v11.2.0; 2) 3GPP TS 36.212 v11.2.0; 3) 3GPP TS 36.213 v11.2.0; 4) 3GPP TS 36.331 v11.2.0; 5) R1-125402, 3GPP TS 36.211 CR; and 6) R1-125404, 3GPP TS 36.213 CR. Channel quality indicator (CQI) is defined in section 7.2.3 of 3GPP TS 36.213 v11.2.0. Differential CQI is described in section 7.2 of 3GPP TS 36.213 v11.2.0. A channel state information (CSI) process is described in 3GPP TS 36.331 v11.2.0. Physical uplink control channel (PUCCH) mode 1-1 is described in section 7.2.2 of 3GPP TS 36.213 v11.2.0. PUCCH mode 2-1 is also described in section 7.2.2 of 3GPP TS 36.213 v11.2.0.

In 3GPP LTE-Advanced standards, wide beam patterns are used for CSI-RS transmissions. The beam (virtualization) patterns of antenna ports are transparent to the user equipment (UEs). The UEs may not know or need to know the virtualization pattern for transmission/reception. A channel coefficient from each CSI reference signal (RS) port to a UE may correspond to a composite response of multiple paths, and is often frequency selective. The UE estimates channel coefficients relying on CSI-RS, and then using the estimated channels to calculate various parameters including precoding matrix indicator (PMI), rank indicator (RI) and CQI (for <=8 CSI-RS ports) or PMI, RI, precoding type indicator (PTI) and CQI (for 8 CSI-RS ports) according to enhanced Node B (eNB) (e.g., base station (BS)) configuration.

When all CSI-RS ports have wide beams, the average power of signals received from the CSI-RS ports is on a similar order. The similar power levels partially motivated constant-modulus precoding matrices/vectors in legacy LTE codebooks in 3GPP TS 36.211 and 36.213. When a vector/matrix is constant-modulus, all the elements of each vector/matrix have the same magnitude.

Accordingly, there is a need for improved communication techniques and standards in advanced wireless communication systems.

SUMMARY

Embodiments of the present disclosure provide methods and apparatuses for channel state information feedback design in advanced wireless communication systems.

In one exemplary embodiment, a method for providing feedback includes receiving a first set of channel state information reference signals (CSI-RS) and a second set of CSI-RS, calculating a channel quality indicator (CQI) using a received power of the first set of CSI-RS and a channel matrix estimated based on the second set of CSI-RS, and sending feedback based on the calculated CQI.

In another exemplary embodiment, an apparatus in a UE configured to provide feedback in a wireless communication system is provided. The apparatus includes a receiver configured to receive a first set of channel state information reference signal (CSI-RS) and a second set of CSI-RS; a controller configured to calculate a channel quality indicator (CQI) using a received power of the first set of CSI-RS and a channel matrix estimated based on the second set of CSI-RS; and a transmitter configured to send feedback based on the calculated CQI.

In yet another exemplary embodiment, an apparatus in a base station (BS) is configured to receive feedback in a wireless communication system. The apparatus include a controller configured to control generation and transmission of a first set of channel state information reference signal (CSI-RS) and a second set of CSI-RS; and a receiver configured to receive feedback based on a channel quality indicator (CQI) calculated using a received power of the first set of CSI-RS and a channel matrix estimated based on the second set of CSI-RS.

In another exemplary embodiment, a method for providing feedback by a UE in a wireless communication system is provided. The method includes measuring signals received on a plurality of channel state information reference signal (CSI-RS) ports; selecting a plurality of combinations of the CSI-RS ports; applying a plurality of precoding matrixes to each of the selected combinations of CSI-RS ports; calculating channel quality indicator (CQI) values for each of the applications of precoding matrixes to each of the selected combinations of CSI-RS ports; selecting a selected port number (SPN), a selected port index (SPI), a precoding matrix indicator (PMI) corresponding to one of the plurality of precoding matrixes, and a rank indicator (RI) that yields a highest CQI from among the calculated CQI values, wherein the SPN is a number of selected CSI-RS ports and is equal to the RI, and wherein the SPI includes indices of the selected CSI-RS ports; sending feedback indicating the SPI, the highest CQI value, the PMI, and at least one of the SPN or the RI.

In yet another exemplary embodiment, an apparatus in a UE configured to provide feedback in a wireless communication system is provided. The apparatus includes a controller configured to measure signals received on a plurality of channel state information reference signal (CSI-RS) ports; select a plurality of combinations of the CSI-RS ports; apply a plurality of precoding matrixes to each of the selected combinations of CSI-RS ports; calculate channel quality indicator (CQI) values for each of the applications of precoding matrixes to each of the selected combinations of CSI-RS ports selection; and select a selected port number (SPN), a selected port index (SPI), a precoding matrix indicator (PMI) corresponding to one of the plurality of precoding matrixes, and a rank indicator (RI) that yields a highest CQI from among the calculated CQI values, wherein the SPN is a number of selected CSI-RS ports and is equal to the RI, and wherein the SPI includes indices of the selected CSI-RS ports; and a transmitter configured to send feedback indicating the SPI, the CQI, the PMI and at least one of the SPN or the RI.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a high-level diagram of an orthogonal frequency division multiple access transmit path in accordance with an illustrative embodiment of the present disclosure;

FIG. 3 illustrates a high-level diagram of an orthogonal frequency division multiple access receive path in accordance with an illustrative embodiment of the present disclosure;

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
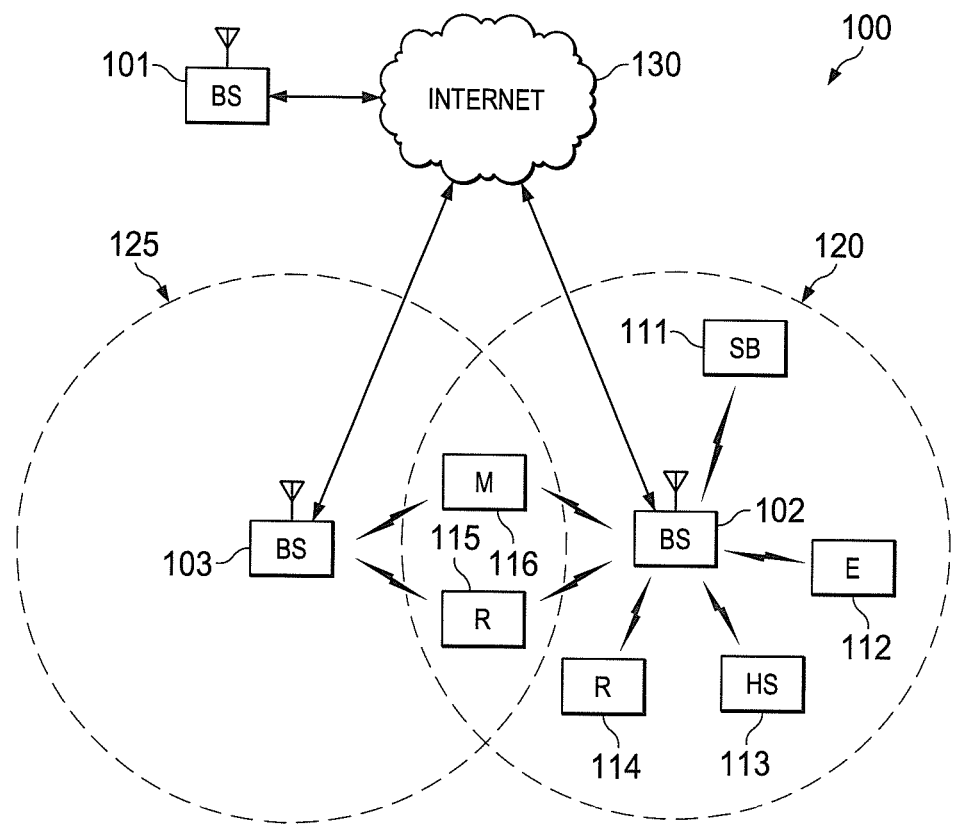
FIG. 1 illustrates an exemplary wireless system which transmits messages in accordance with an illustrative embodiment of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., eNB, Node B), such as BS 101, BS 102, BS 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of UEs (e.g., mobile phone, mobile station, subscriber station) within coverage area 120 of base station 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (M), such as a cell phone, a wireless laptop, a wireless PDA, or the like.

Base station 103 provides wireless broadband access (via base station 101) to Internet 130 to a second plurality of UEs within coverage area 125 of base station 103. The second plurality of UEs includes UE 115 and UE 116. In an exemplary embodiment, base stations 101-103 may communicate with each other and with UEs 111-116 using OFDM or OFDMA techniques.

While only six UEs are depicted in FIG. 1, it is understood that wireless system 100 may provide wireless broadband access to additional UEs. It is noted that UE 115 and UE 116 are located on the edges of both coverage area 120 and coverage area 125. UE 115 and UE 116 each communicate with both base station 102 and base station 103 and may be said to be operating in handoff mode, as known to those of skill in the art.

UEs 111-116 may access voice, data, video, video conferencing, and/or other broadband services via Internet 130. In an exemplary embodiment, one or more of UEs 111-116 may be associated with an access point (AP) of a WiFi WLAN. UE 116 may be any of a number of mobile devices, including a wireless-enabled laptop computer, personal data assistant, notebook, handheld device, or other wireless-enabled device. UEs 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in BS 102 or a relay station, and the receive path circuitry 300 may be implemented in a UE (e.g. UE 116 of FIG. 1). In other examples, for uplink communication, the receive path circuitry 300 may be implemented in a base station (e.g. base station 102 of FIG. 1) or a relay station, and the transmit path circuitry 200 may be implemented in a UE (e.g. UE 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to base stations 101-103 and may implement a receive path corresponding to the architecture for receiving in the downlink from base stations 101-103.

Figure 4:
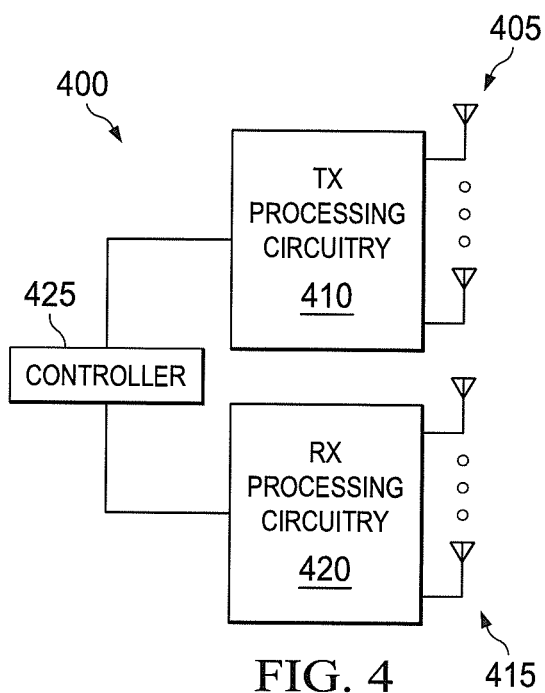
FIG. 4 illustrates a block diagram of a node in a wireless communication system that may be used to implement various embodiments of the present disclosure.

FIG. 4 illustrates a block diagram of a node 400 in a wireless communication system that may be used to implement various embodiments of the present disclosure. In this illustrative example, the node 400 is a device at a communication point in a wireless communications system, such as, for example, wireless system 100 in FIG. 1. The node 400 may be a base station (e.g., eNB, RS, RRH, etc.) or a UE (e.g., mobile station, subscriber station, etc.). In one example, the node 400 is an example of one embodiment of the UE 116 in FIG. 1. In another example, the node 400 is an example of one embodiment of the base station 102 in FIG. 1. Node 400 comprises transmit (TX) antennas 405, transmit (TX) processing circuitry 410, receive (Rx) antennas 415, receive (Rx) processing circuitry 420, and controller 425.

TX processing circuitry 410 (e.g., a transmitter) receives analog or digital signals from outgoing baseband data. TX processing circuitry 410 encodes, multiplexes, and/or digitizes the outgoing baseband data to produce a processed RF signal that is transmitted via TX antennas 405. For example, the TX processing circuitry 410 may implement a transmit path that is analogous to the transmit processing circuitry 200 in FIG. 2. TX processing circuitry 410 may also perform spatial multiplexing via layer mapping to different antennas in TX antennas 405 and different ports of antennas in TX antennas 405.

Rx processing circuitry 420 (e.g., a receiver) receives from Rx antennas 415 an incoming RF signal or signals transmitted by one or more transmission points, such as base stations, relay stations, remote radio heads, UEs, etc. Rx processing circuitry 420 processes the received signal(s) to identify the information transmitted by the transmission point(s). For example, the Rx processing circuitry 420 may down-convert the incoming RF signal(s) to produce an intermediate frequency (IF) or a baseband signal by channel estimation, demodulating, stream separating, filtering, decoding, and/or digitizing the received signal(s). For example, the Rx processing circuitry 420 may implement a receive path that is analogous to the receive processing circuitry 300 in FIG. 3.

Controller 425 controls the overall operation of node 400. In one such operation, controller 425 controls the reception of channel signals and the transmission of channel signals by Rx processing circuitry 420 and TX processing circuitry 410, in accordance with well-known principles.

The embodiment of node 400 illustrated in FIG. 4 is for illustration only. Other embodiments of the node 400 may be used without departing from the scope of this disclosure. For example, the antennas in the TX and Rx antenna arrays may overlap or be the same antenna arrays used for transmission and reception via one or more antenna switching mechanisms.

Figure 5:
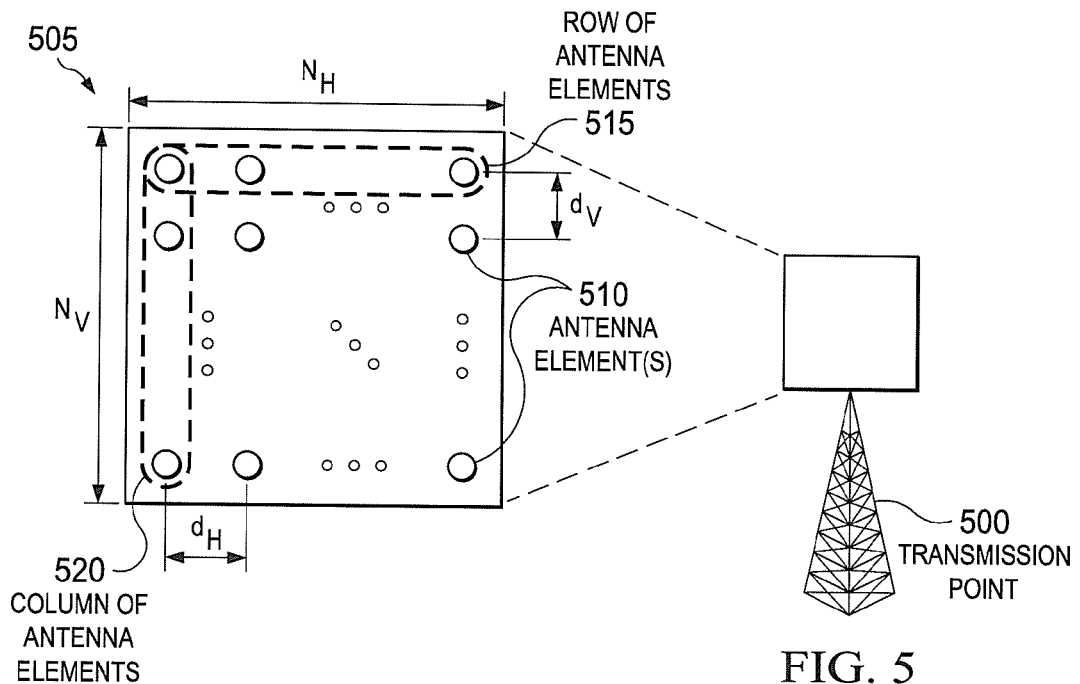
FIG. 5 illustrates a transmission point (e.g., BS, eNB) equipped with a full-dimension multi-input multi-output (FD-MIMO) or a system capable of elevation beamforming in accordance with various embodiments of the present disclosure.

FIG. 5 illustrates a transmission point 500 (e.g., BS, eNB) equipped with a full-dimension multi-input multi-output (FD-MIMO) or system capable of elevation beamforming in accordance with various embodiments of the present disclosure. The antenna panel 505 of the base station comprises $N_V \cdot N_H$ antenna elements 510, wherein $N_H$ antenna elements are placed on a substantially horizontal line, and there are $N_V$ such substantially horizontal lines containing $N_H$ antenna elements placed side by side on the same panel. Examples of the substantially horizontal line and the substantially vertical line are row of antenna elements 515 and column of antenna elements 520. Any two closest antenna elements placed on the substantially horizontal line are spaced apart by $d_H$, and any two closest antenna elements placed on a substantially vertical line are spaced apart by $d_V$.

A new transmission mode that supports the FD-MIMO or elevation beamforming is denoted as transmission mode (TM) X. The main features of TM X may include allowing a new MU-MIMO (multi-user MIMO) transmission scheme multiplexing up to 8 layers (or up to 8 UEs).

Embodiments of the present disclosure recognize that approximately 80% of UEs in a macro cell are indoor, while approximately only 20% of UEs are outdoor. In urban environments, indoor UEs can be located on different floors and likely do not frequently make movements in vertical directions. The vertical movements happen infrequently, for example, when a user of the UE rides an elevator or climbs stairs. Hence, it is likely that the CSI measured at a certain elevation may be static over a long period of time. Accordingly, embodiments of the present disclosure recognize that it is beneficial to take this aspect into account when designing CSI feedback for FD-MIMO and elevation beamforming.

Elevation or vertical domain coverage of a cell is often limited by the beam width of antenna elements. For example, in recent 3GPP channel modeling, the vertical antenna half-power beam width is 65 degrees. When a standard antenna virtualization precoding is applied for the first column of antenna elements comprising 10 antenna elements, the vertical beam width becomes approximately 10 degrees. Roughly speaking, if there are 8 such vertical beams with different steering angles, the entire vertical angle space can be covered by the 8 vertical beams. If the 8 vertical beams are transmitted on 8 CSI-RS ports, a UE can simply measure the power of the vertical beams to identify the vertical CSI, with good precision.

In contrast, for the azimuth or horizontal domain, a larger number of beams may be required (e.g., 12 horizontal beams based on current standards) to cover the entire 120 degree sector (e.g., for a BS with an antenna array designed to cover 120 degree sectors) divided into the same narrow beam width of 10 degrees. In addition, it is more likely to have a larger scattering in horizontal domain, which may help to have a larger number of high transmission ranks (e.g., rank 2 or above). With these observations, embodiments of the present disclosure recognize that it does not seem to be desirable to have narrow-beam CSI-RS for horizontal domain, as it requires large CSI-RS transmission overhead, and it may not be suitable for CSI estimation of high ranks. Accordingly, embodiments of the present disclosure recognize to design CSI-RS to leverage efficiently of the vertical and horizontal channels.

Figure 6:
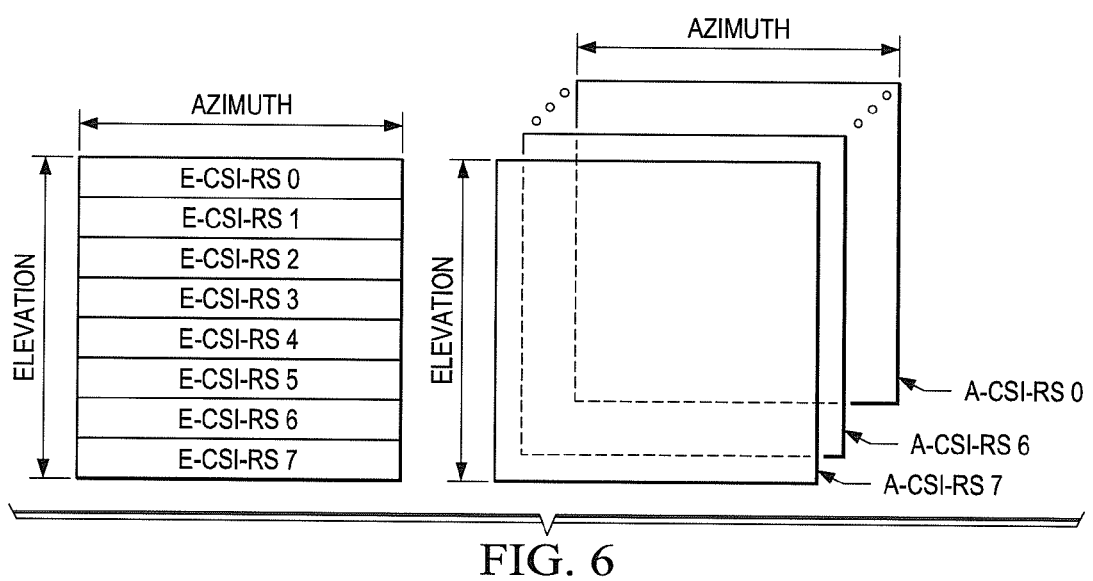
FIG. 6 illustrates a design for CSI-RS transmissions in accordance with an embodiment of the present disclosure.

FIG. 6 illustrates a design for CSI-RS transmissions in accordance with an embodiment of the present disclosure. In this illustrative embodiment, the base station configures a serving UE with two CSI-RS configurations or two types of configured CSI-RS (e.g., E-CSI-RS and A-CSI-RS wherein "E" and "A" stand for elevation and azimuth respectively) for CSI estimation of an FD-MIMO system or elevation beamforming system. In this example, the E-CSI-RS and the A-CSI-RS are quasi-co-located.

Figure 7:
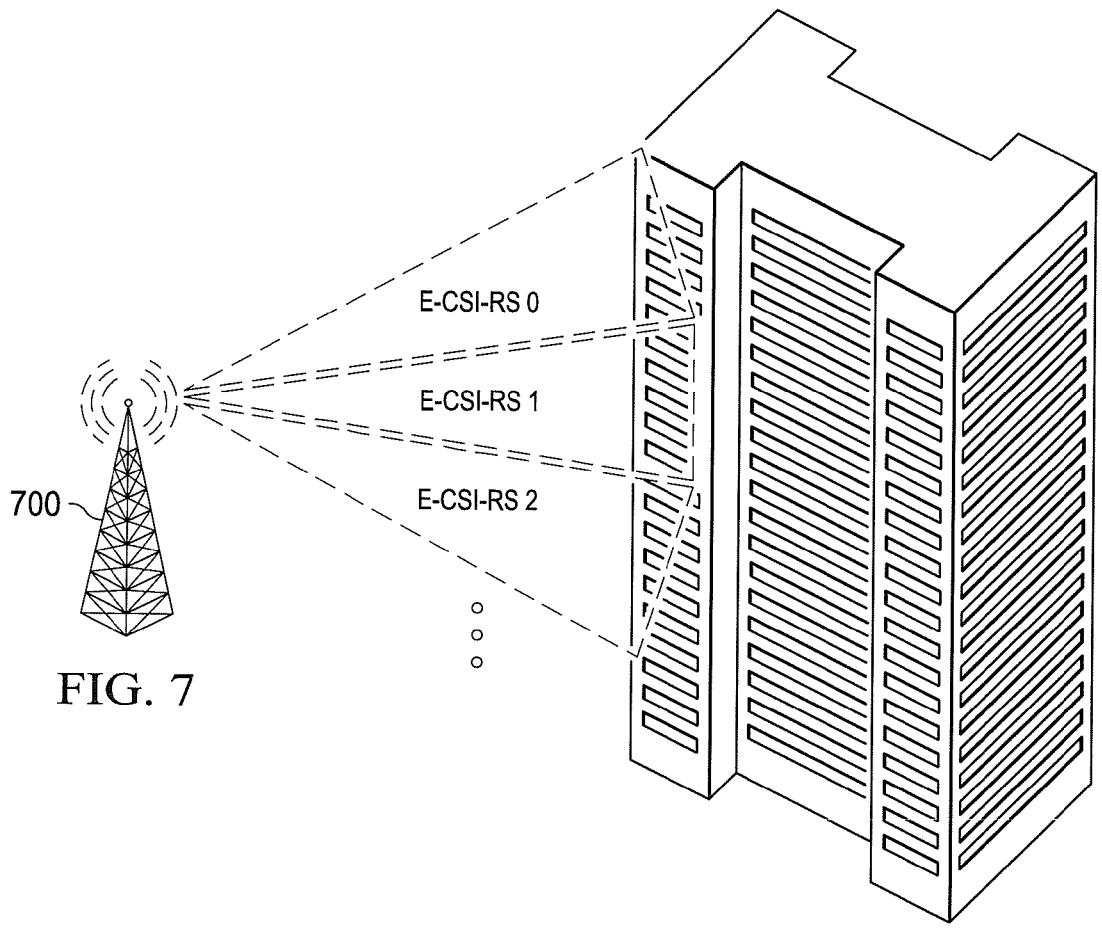
FIG. 7 illustrates an example of spatial coverage of two types of CSI-RS transmitted by the BS, for example elevation CSI-RS (E-CSI-RS) and azimuth CSI-RS (A-CSI-RS) in accordance with an exemplary embodiment of the present disclosure.

FIG. 7 illustrates an example of spatial coverage of two types of CSI-RS transmitted by the BS 700. In one illustrative example, the number of E-CSI-RS ($N_E$) transmitted may be 8, and the number of A-CSI-RS ($N_A$) transmitted may also be 8. This example can be supported with a base station having an antenna panel comprising $N_V \cdot N_H$ antenna elements, where $N_V = N_H = 8$. This example is for illustration only and any number of E-CSI-RS and A-CSI-RS can be transmitted without departing from the principles of the present disclosure.

As illustrated in FIG. 6, the E-CSI-RS covers a wide angle in the horizontal or azimuth domain, which may be the same as the sectorization angle, e.g., 120 degrees in the scenario where the base station partitions the 360 degree cell into three sectors. In the vertical or elevation domain, the spatial coverage of each E-CSI-RS is within a narrow angle. In one example, a subset of the entire 180 degree elevation angles is partitioned into $N_E$ partitions, and each of the $N_E$ E-CSI-RS covers a partition, where the size of the 8 partitions can be the same or different. In another example, the $N_E$ E-CSI-RS are transmitted according to 8 corresponding (and potentially overlapping) beam patterns, where the $N_E$ beams cover a subset of the entire 180 degree elevation, where the beam width of the 8 beams can be the same or different.

As illustrated in FIG. 7, the narrow E-CSI-RS beams may cover different floors in a high-rise building. The different E-CSI-RS beams can be formed by applying different beamforming (or antenna virtualization precoding) weights on the antenna elements vertically placed. For example, the base station may select a first column of antenna elements to transmit the ($N_E$=8) E-CSI-RS beams and apply $N_E$ different beamforming weight vectors of size $N_V \times 1$, $w_V^{(m)}$, m=0, ..., $N_E$−1, to construct the $N_E$ E-CSI-RS beams, where $w_V^{(m)}$ is a beamforming weight vector for E-CSI-RS port m. The UE receiving the E-CSI-RS may identify that the 8 E-CSI-RS has different received signal power depending upon the 3D UE location. For example, two UEs on different floors in the same building may identify that different E-CSI-RS are the strongest.

On the other hand, all the $N_A$ A-CSI-RS cover wide angles in both horizontal and azimuth domains to provide sufficient coverage in a sector. The $N_A$ A-CSI-RS can be respectively sent from the 8 antenna elements of a first row of antenna elements, one A-CSI-RS from one antenna element.

Embodiments of the present disclosure provide two types of CSI-RS. Although FIGS. 6 and 7 illustrate the two types of CSI-RS as being present in azimuth/horizontal and elevation/vertical domains, any other types of CSI-RS may be utilized. For example, in Cartesian coordinate systems, y and x domains may be utilized; in spherical coordinates, colatitude/zenith/normal/inclination and azimuth/horizontal domains may be utilized.

Figure 8:
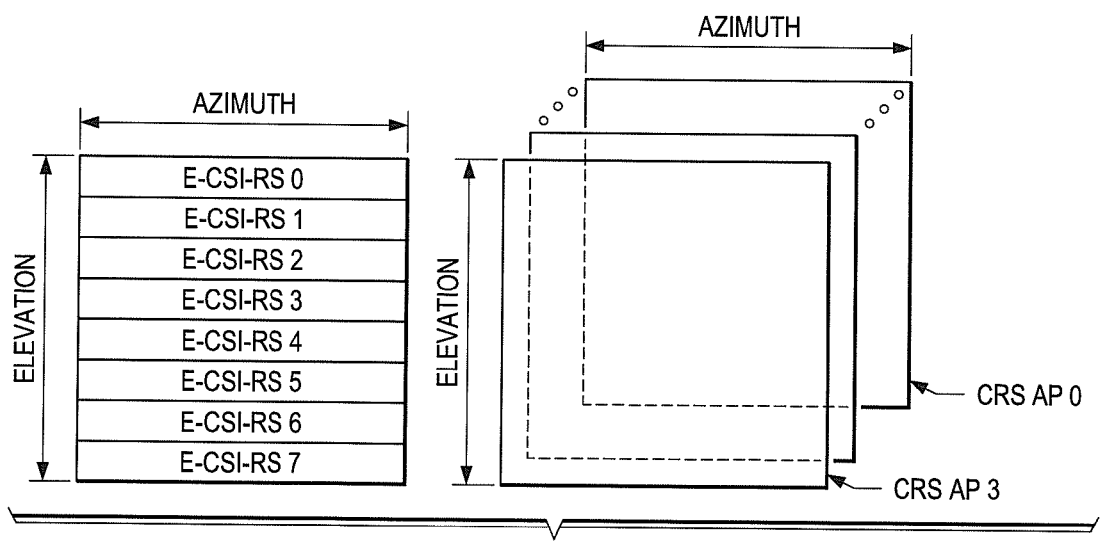
FIG. 8 illustrates an example of spatial coverage of E-CSI-RS and cell-specific reference signals (CRS) transmitted by the base station in accordance with an exemplary embodiment of the present disclosure.

FIG. 8 illustrates an example of spatial coverage of E-CSI-RS and cell-specific reference signals (CRS) transmitted by the base station. In this illustrative embodiment, the base station configures a serving UE with one E-CSI-RS and CRS, for CSI estimation of an FD-MIMO system or elevation beamforming system. In this example, the E-CSI-RS and the CRS are quasi-co-located. As illustrated, $N_E$=8 E-CSI-RS are transmitted, and $N_A$=4 CRS are transmitted. This illustrative example can be supported by a base station with an antenna panel comprising $N_V \cdot N_H$ antenna elements. This example is for illustration only, and any number of E-CSI-RS and CRS can be transmitted without departing from the principles of the present disclosure.

In one embodiment, the UE utilizes the E-CSI-RS to derive CSI in the elevation domain (E-CSI). E-CSI may comprise at least one of n E-CSI-RS indices and the received signal powers of the corresponding n E-CSI-RS.

In one method, the UE may be configured to feed back the index of the strongest (or most preferred) E-CSI-RS port, along with the received signal power for the strongest E-CSI-RS. The received signal power may be quantized as a CQI index. In one example, CSI feedback contents may be configured according to Table 1.

TABLE 1 exemplary CSI feedback contents associated with the E-CSI-RS

| Feedback Information | Number of bits | Contents |
|---|---|---|
| Preferred E-CSI-RS Index ($I_{E\text{-}CSI\text{-}RS}$) | $\lceil \log_2(N_E) \rceil$ | Port index of the preferred E-CSI-RS |
| Received signal power | 4 | CQI index (e.g., as defined in Table 7.2.3-1 of section 7.2.3 of 3GPP TS 36.213 v11.2.0) corresponding to the received power on the preferred E-CSI-RS port |

In another method, the UE may be configured to feedback n indices of the n strongest E-CSI-RS, along with the received signal powers for the n strongest E-CSI-RS. Each received signal power can be quantized as a CQI index. In one example, n=2. This alternative helps the eNB to select an alternative vertical beam to reduce MU interference in MU-MIMO transmissions. In one example, CSI feedback contents may be configured according to Table 2.

TABLE 2 exemplary CSI Feedback contents associated with the E-CSI-RS

| Feedback Information | Number of bits | Contents |
|---|---|---|
| Preferred E-CSI-RS Indices | Alt a: $2\lceil \log_2(N_E) \rceil$<br>Alt b: $\left\lceil \log_2\left(\frac{N_E(N_E-1)}{2}\right) \right\rceil$ | Port indices of the 1$^{st}$ and 2$^{nd}$ preferred E-CSI-RS<br>Alt a: The two port indices are separately coded, and mapped onto states of two $2\lceil \log_2(N_E) \rceil$-bit fields.<br>Alt b: The two port indices are jointly coded and mapped onto states of a single $\left\lceil \log_2\left(\frac{N_E(N_E-1)}{2}\right) \right\rceil$-bit field. |
| Received signal power of the 1$^{st}$ preferred E-CSI-RS | 4 bits | CQI index (e.g., as defined in Table 7.2.3-1 of section 7.2.3 of 3GPP TS 36.213 v11.2.0) corresponding to the received power on the 1$^{st}$ preferred E-CSI-RS port |
| Received signal power the 2$^{nd}$ preferred E-CSI-RS | Alt 1: 4 bits<br>Alt 2: 3 bits | Alt 1: CQI index (e.g., according to Table 7.2.3-1 of section 7.2.3 of 3GPP TS 36.213 v11.2.0) corresponding to the received power on the 2$^{nd}$ preferred E-CSI-RS port<br>Alt 2: differential CQI index (e.g., according to Table 7.2-2 of section 7.2 of 3GPP TS 36.213 v11.2.0) quantizing the relative power difference of the 1$^{st}$ and the 2$^{nd}$ preferred E-CSI-RS ports |

As E-CSI is likely to be static over a long period of time, E-CSI feedback in periodic CSI reporting can be less frequent than PMI/CQI reporting. Furthermore, as E-CSI is not likely as frequency-selective as A-CSI, E-CSI contents can be defined as wideband contents.

In one embodiment, the UE utilizes the A-CSI-RS or the CRS to derive CSI in azimuth domain (A-CSI). A-CSI may comprise at least one of CQI, PMI and RI. The PMI corresponds to an index of a precoder codeword (e.g., $w_H^{(l)}$) that allows the UE to obtain α % error probability (e.g., α=0.1) with the highest CQI index and RI. In an example of rank 1, $w_H^{(l)}$ is 8×1 when a number of antenna elements in the substantially horizontal line is $N_A$=8. In one example, the UE may rely solely on A-CSI-RS for deriving CQI, PMI and RI.

In one embodiment, the UE utilizes the E-CSI-RS and the A-CSI-RS (or the CRS) to derive the CSI. The UE may rely solely on the A-CSI-RS (or the CRS) for deriving PMI and RI. The RI and the PMI corresponds to an index of the transmission rank, say r, and an index of a precoder codeword, say $w_H^{(l)}$, that allows the UE to obtain α % error probability (e.g., α=0.1), when a modulation and coding rate indicated by the CQI index $I_{CQI}$ is used. In one example, the UE tries to find the RI and the PMI that achieves the largest SINR (or throughput) to obtain the α % error probability.

The UE relies on both A-CSI-RS (or the CRS) and E-CSI-RS for deriving the CQI. In one example, the UE is configured to report a joint CQI and preferred E-CSI-RS port index as well as the PMI and the RI. The joint CQI is the highest CQI index $I_{CQI}$ that allows the UE to obtain α % error probability (e.g., α=0.1) with the selected (or reported) PMI and RI. To find the joint CQI, the UE multiplies the positive square root of the received power of the preferred (or strongest) E-CSI-RS to the channel estimates of the A-CSI-RS antenna ports (or CRS antenna ports), to derive the CQI. In other words, the joint CQI (or $I_{MCS}$) is derived with estimated channel matrix of $\sqrt{P_{E\text{-}CSI\text{-}RS}^{(e)}} \cdot H_{AZ}$ where $P_{E\text{-}CSI\text{-}RS}^{(e)}$ is the received power on the preferred E-CSI-RS port of index e, (e=0, 1, ..., $N_E$−1), and $H_{AZ}$ is the channel matrix estimated from the A-CSI-RS (or the CRS). In one example, CSI feedback contents may be configured according to Table 3.

TABLE 3 exemplary CSI Feedback contents associated with the A-CSI-RS and E-CSI-RS

| Feedback Information | Number of bits | Contents |
|---|---|---|
| PMI | Variable dependent upon the number of configured A-CSI-RS antenna ports ($N_A$) and transmission/feedback modes | Precoding matrix indicator for the azimuth (or horizontal) channels |
| RI | Variable dependent upon the number of configured A-CSI-RS antenna ports ($N_A$) and transmission/feedback modes. Ex) 1 (if $N_A$ = 2); 2 (if $N_A$ = 4); 3 (if $N_A$ = 8) | Rank indicator for the azimuth (or horizontal) channels |
| Preferred E-CSI-RS Index ($I_{E\text{-}CSI\text{-}RS}$) | $\lceil \log_2(N_E) \rceil$ | Port index of the preferred E-CSI-RS |
| (Joint) CQI | 4 (if RI = 1) 4 + 3 (if RI > 1. 4 bits for CQI of a first CW, 3 bits for differential CQI of a second CW with respect to the first CW) | CQI index (e.g., as defined in Table 7.2.3-1 of section 7.2.3 of 3GPP TS 36.213 v11.2.0) derived with the estimated channel matrix of $\sqrt{P_{E\text{-}CSI\text{-}RS}^{(e)}} \cdot H_{Az}$ |

In another example, the UE is configured to report a first CQI, PMI and RI derived with the A-CSI-RS (or the CRS), and a preferred E-CSI-RS index and a second CQI associated with the received power on the preferred E-CSI-RS. The second CQI can be either absolute CQI (e.g., according to Table 7.2.3-1 of section 7.2.3 of 3GPP TS 36.213 v11.2.0) or a differential CQI with respect to the first CQI (e.g., according to Table 7.2-2 of section 7.2 of 3GPP TS 36.213 v11.2.0). In one example, CSI feedback contents may be configured according to Table 4.

TABLE 4 exemplary CSI Feedback contents associated with the A-CSI-RS and E-CSI-RS

| Feedback Information | Number of bits | Contents |
|---|---|---|
| PMI | Variable dependent upon the number of configured A-CSI-RS antenna ports ($N_A$) and transmission/feedback modes | Precoding matrix indicator for the azimuth (or horizontal) channels |
| RI | Variable dependent upon the number of configured A-CSI-RS antenna ports ($N_A$) and transmission/feedback modes. Ex) 1 (if $N_A$ = 2); 2 (if $N_A$ = 4); 3 (if $N_A$ = 8) | Rank indicator for the azimuth (or horizontal) channels |
| A first CQI | 4 (if RI = 1) 4 + 3 (if RI > 1. 4 bits for CQI of a first CW, 3 bits for differential CQI of a second CW with respect to the first CW) | CQI index (e.g., as defined in Table 7.2.3-1 of section 7.2.3 of 3GPP TS 36.213 v11.2.0) derived with the estimated channel matrix of $H_{Az}$ |
| Preferred E-CSI-RS Index ($I_{E\text{-}CSI\text{-}RS}$) | $\lceil \log_2(N_E) \rceil$ | Port index of the preferred E-CSI-RS |
| A second CQI | Alt 1: 4 bits Alt 2: 3 bits (if RI = 1) | Alt 1: CQI index (e.g., according to Table 7.2.3-1 of section 7.2.3 of 3GPP TS 36.213 v11.2.0) corresponding to the received power on the preferred E-CSI-RS port Alt 2: differential CQI index (e.g., according to Table 7.2-2 of section 7.2 of 3GPP TS 36.213 v11.2.0) with respect to the first CQI |

In another example, the UE is configured to report a first CQI, PMI, RI derived with the A-CSI-RS (or the CRS), a pair of preferred E-CSI-RS indices, and a second and a third CQI associated with the received power on the preferred E-CSI-RS. The second and the third CQI can be either absolute CQI (e.g., according to Table 7.2.3-1 of section 7.2.3 of 3GPP TS 36.213 v11.2.0) or a differential CQI with respect to the first CQI (e.g., according to Table 7.2-2 of section 7.2 of 3GPP TS 36.213 v11.2.0).

In one embodiment, for configuration of CSI-RS transmission and CSI feedback, a new CSI process (i.e., CSI-Process) is defined. Furthermore, the new CSI process is associated with two CSI-RS resources, i.e., A-CSI-RS and E-CSI-RS. An example construction of CSI-process is described below, where for estimating CQI (for any of the first, the second, or the third CQIs in above embodiments), the UE assumes common CSI-IM and P-C.

```
CSI-Process ::=         SEQUENCE {
    csi-ProcessIdentity     CSI-ProcessIdentity,
    a-csi-RS-IdentityNZP    CSI-RS-IdentityNZP,
    e-csi-RS-IdentityNZP    CSI-RS-IdentityNZP,
    csi-IM-Identity         CSI-IM-Identity
```

```
    p-C-AndAntennaInfoDedList SEQUENCE (SIZE (1..2)) OF P-C-AndAntennaInfoDed,
    cqi-ReportBothPS          CQI-ReportBothPS         OPTIONAL,   -- Need OR
    cqi-ReportPeriodicId INTEGER (0..maxCQI-Ext)       OPTIONAL,   -- Need OR
    cqi-ReportAperiodicPS     CQI-ReportAperiodicPS    OPTIONAL,   -- Need OR
    ...
}
```

For CSI feedback according to this CSI process, a single aperiodic CSI feedback configuration may be sufficient, as all the CSI contents can be multiplexed on the scheduled physical uplink shared channel (PUSCH) when the aperiodic CSI is triggered.

On the other hand, for periodic CSI feedback, at least two alternative methods of configuring the UE behavior on E-CSI (at least one of preferred E-CSI-RS index or indices, the second CQI and the third CQI) and A-CSI (PMI, RI, or the first CQI) are provided. In a first alternative, E-CSI reporting and A-CSI reporting are separately configured by two periodic CSI configurations. In other words, two cqi-ReportPeriodicId may be configured per CSI process, one for E-CSI and the other for A-CSI. In a second alternative, one periodic CSI configuration configures the UE behavior for E-CSI and A-CSI feedback.

In another embodiment, for configuration of CSI-RS transmission and CSI feedback, a new CSI process (i.e., CSI-Process) is defined. Furthermore, the new CSI process is associated with a CSI-RS resource, i.e., E-CSI-RS and a CRS quasi-co-located with the E-CSI-RS. An example construction of CSI-process is described below, where, for estimating CQI (for any of the first, the second, or the third CQIs in above embodiments), the UE assumes common CSI-IM and P-C.

is 1 bit (for preferred E-CSI-RS index)+2 bits (for RI)=3 bits. In another example, when $N_E=8$ and $N_A=8$, the total number of information bits to be carried on the PUCCH is 3 bits (for preferred E-CSI-RS index)+3 bits (for RI)=6 bits.

Figure 9A:
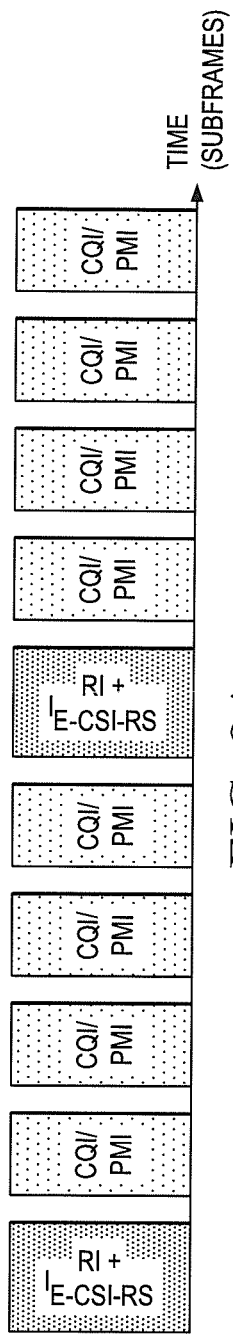
FIGS. 9A-9C illustrate an example of periodic CSI transmission in PUCCH mode 1-1 according to some embodiments of the present disclosure.
Figure 9B:
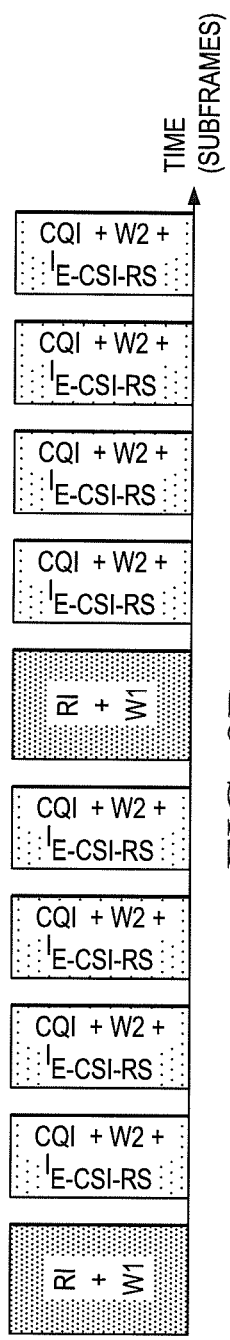

FIG. 9B illustrates an example of PUCCH mode 1-1 submode 1 with 8 antenna ports, according to some embodiments of the present disclosure. For example, for TM X, when 8 CSI-RS ports and submode 1 are configured, the PUCCH feedback carries either (RI, W1), or (CQI, W2, $I_{E\text{-}CSI\text{-}RS}$). (RI, W1) is less frequently fed back than (CQI, W2, $I_{E\text{-}CSI\text{-}RS}$).

Figure 10:
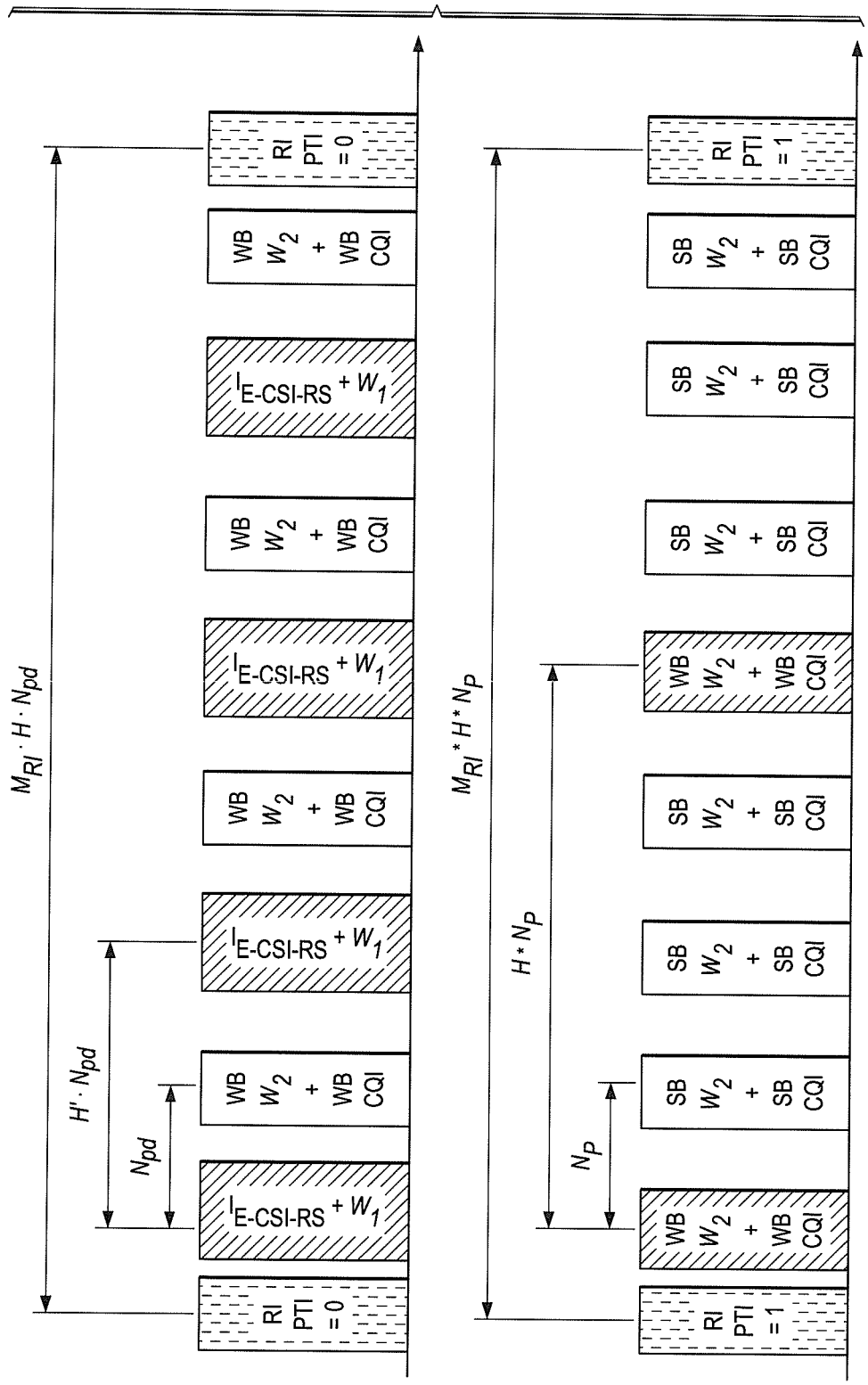
FIG. 10 illustrates an example of periodic CSI transmission in PUCCH mode 2-1 according to some embodiments of the present disclosure.

FIG. 10 illustrates an example of periodic CSI transmission in PUCCH mode 2-1 (wideband CQI/PMI, subband CQI), according to some embodiments of the present disclosure. For example, the periodic CSI transmission in PUCCH mode 2-1 illustrated in FIG. 10 may be implemented in accordance with the embodiments associated with Table 3 above. In this illustrative example, where W1 is reported, the preferred E-CSI-RS index (or indices) is jointly fed back with W1 on the same PUCCH resource. One advantage of this arrangement is that the other remaining PUCCH reports are intact and can be kept the same. Furthermore, multiplexing $I_{E\text{-}CSI\text{-}RS}$ with W1 is useful because W1 is reported less frequently than the SB CQI/PMI (W2) and the preferred E-CSI-RS may be considered a slowly varying component similarly to W1.

```
CSI-Process ::=           SEQUENCE {
    csi-ProcessIdentity       CSI-ProcessIdentity,
    e-csi-RS-IdentityNZP      CSI-RS-IdentityNZP,
    csi-IM-Identity           CSI-IM-Identity
    p-C-AndAntennaInfoDedList SEQUENCE (SIZE (1..2)) OF P-C-AndAntennaInfoDed,
    cqi-ReportBothPS          CQI-ReportBothPS         OPTIONAL,   -- Need OR
    cqi-ReportPeriodicId INTEGER (0..maxCQI-Ext)       OPTIONAL,   -- Need OR
    cqi-ReportAperiodicPS     CQI-ReportAperiodicPS    OPTIONAL,   -- Need OR
    ...
}
```

Figure 9C:
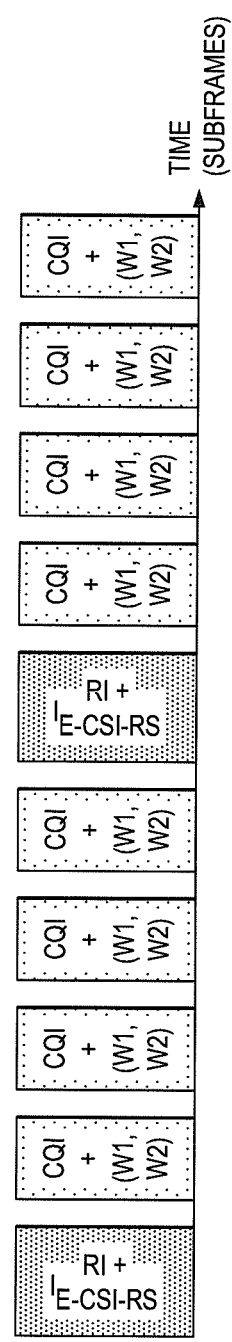

FIGS. 9A-9C illustrate an example of periodic CSI transmission in PUCCH mode 1-1 (wideband CQI, single (wideband) PMI), according to some embodiments of the present disclosure. For example, the periodic CSI transmission in PUCCH mode 1-1 illustrated in FIGS. 9A-9C may be implemented in accordance with the embodiments associated with Table 3 above.

Figure 11:
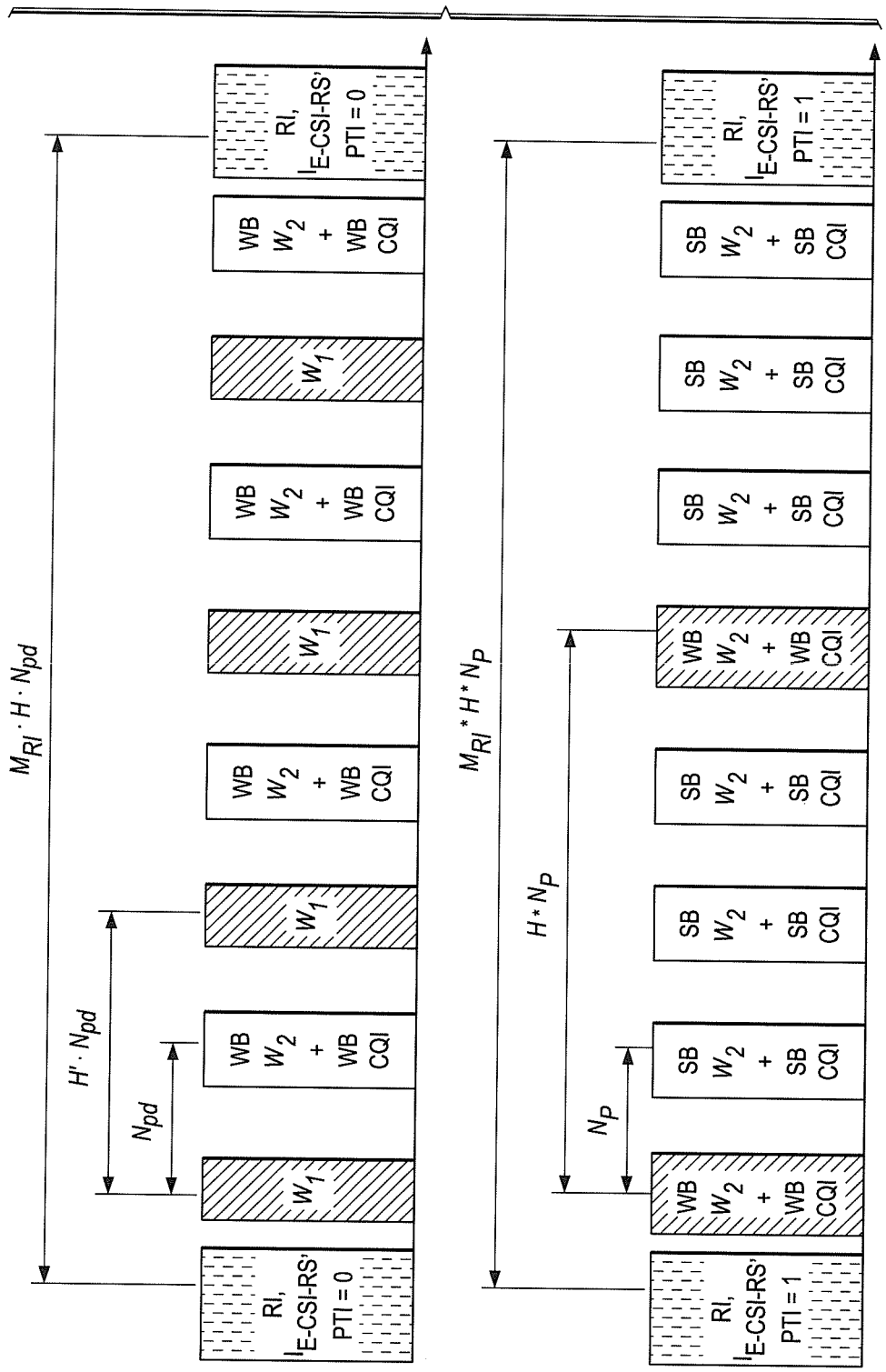
FIG. 11 illustrates another example of periodic CSI transmission in PUCCH mode 2-1 according to some embodiments of the present disclosure.

In some PUCCH modes, the preferred E-CSI-RS index (or indices) is jointly fed back with RI in a subframe where RI is reported, on the same PUCCH resource. This is illustrated by FIGS. 9A and 9C, respectively, in PUCCH mode 1-1 with 2 or 4 antenna ports and PUCCH mode 1-1 submode 2 with 8 antenna ports. One advantage of this arrangement is that the PUCCH report multiplexing CQI and PMI (including W1 and W2) does not need to be modified, as a result of the introduction of the new field of $I_{E\text{-}CSI\text{-}RS}$ (E-CSI-RS index). Furthermore, multiplexing $I_{E\text{-}CSI\text{-}RS}$ with RI is useful because RI is reported less frequently than the CQI/PMI, and the preferred E-CSI-RS may be considered a slowly varying component similarly to RI. In one example, when $N_E=2$ and $N_A=4$, the total number of information bits to be carried on the PUCCH FIG. 11 illustrates another example of periodic CSI transmission in PUCCH mode 2-1 (wideband CQI/PMI, subband CQI), according to some embodiments of the present disclosure. For example, the periodic CSI transmission in PUCCH mode 2-1 illustrated in FIG. 11 may be implemented in accordance with the embodiments associated with Table 3 above. In this illustrative embodiment, in subframes where RI/PTI is reported, the preferred E-CSI-RS index (or indices) is jointly fed back with RI/PTI on the same PUCCH resource.

In one embodiment, in case of aperiodic PUSCH feedback, the preferred E-CSI-RS index (or indices) may be jointly coded and fed back with RI on the RI mapping region on a PUSCH. In one example, a single preferred E-CSI-RS index is fed back together with other CSI contents on PUSCH, where the single preferred E-CSI-RS index is chosen assuming that the preferred E-CSI-RS beam is used across the set of subbands (S), or the entire downlink system bandwidth.

Moreover, even though the present disclosure is described in terms of E-CSI-RS and A-CSI-RS (or CRS), the embodiments of the present disclosure can be applied for a first CSI-RS and a second CSI-RS (or CRS), where the first CSI- RS has a narrow beam in a certain domain and a second CSI-RS (or CRS) has a wide beam.

Figure 12:
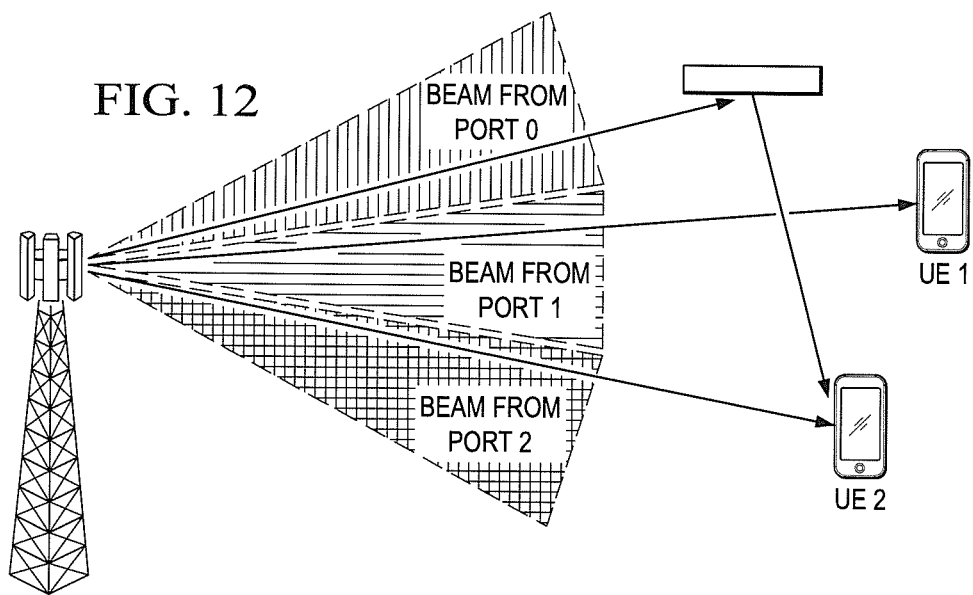
FIG. 12 illustrates narrow-beam CSI-RS transmissions in accordance with an exemplary embodiment of the present disclosure.

FIG. 12 illustrates narrow-beam CSI-RS transmissions in accordance with an exemplary embodiment of the present disclosure. Embodiments of the present disclosure provide methods for CQI and PMI transmissions for narrow-beam CSI-RS. For example, embodiments of the present disclosure provide to use narrow beam pattern for CSI-RS transmissions. As illustrated, each of the CSI-RS for antenna ports from 0 to P−1 has a narrow beam pattern and is steered towards a certain direction. All the P ports together form a wide beam pattern that covers a desired area based on practical needs.

With the narrow-beam CSI-RS transmissions, a UE receives a strong signal from some CSI-RS antenna ports while receiving a weak signal from some other antenna ports, because the CSI-RS is directional (i.e., has a narrow beam width). For example, if the ports had a wide-beam pattern, the UE 2 would receive a much stronger signal power from CSI-RS port 0 than the reflected signal received from CSI-RS port 0 in the narrow-beam pattern illustrated in FIG. 12. In general, with narrow CSI-RS beam width, a UE may find only a few dominant components in $h_0, \ldots, h_{P-1}$; this is different from the case where CSI-RS ports are configured with wide beam width so that $h_0, \ldots, h_{P-1}$ have similar power level in average. A subset of CSI-RS antenna ports dominates when the propagation environment does not have rich scatters, as in the example illustrated in FIG. 13.

Figure 13:
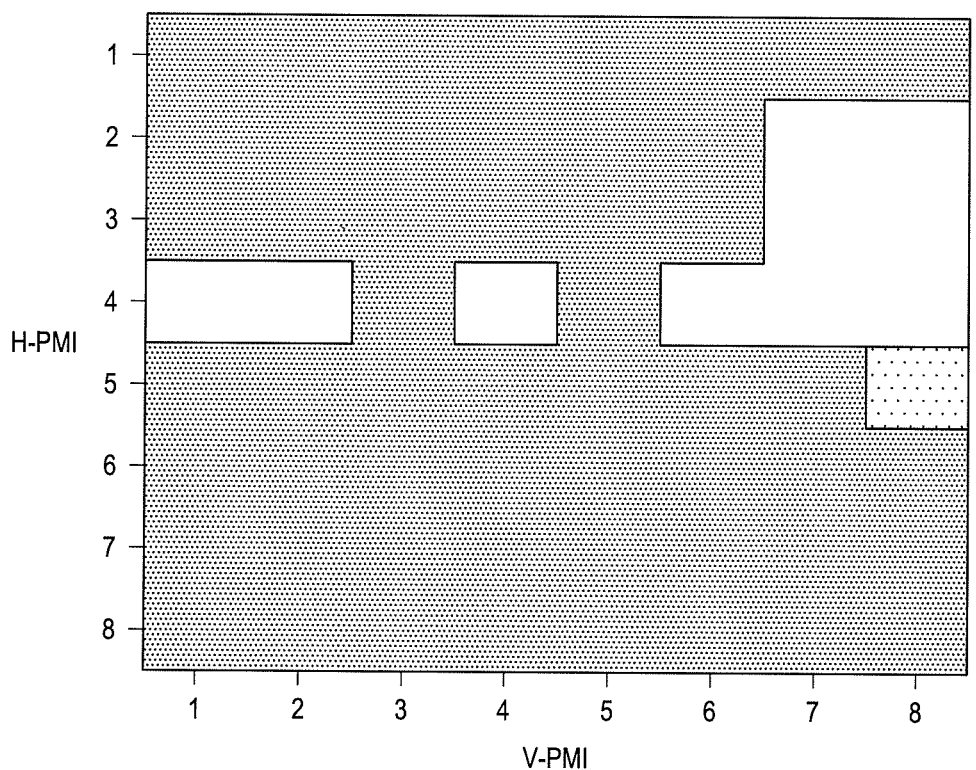
FIG. 13 illustrates signal power received on CSI-RS ports of narrow beam width in accordance with an illustrative embodiment of the present disclosure.

FIG. 13 illustrates signal power received on CSI-RS ports of narrow beam width in accordance with an illustrative embodiment of the present disclosure. As illustrated, each of the grids defined by H-PMI and V-PMI corresponds to a CSI-RS port of narrow beam width. The lighter (e.g., white) blocks correspond to strong signal power while the darker (e.g., black) blocks correspond to weak signal power. As a result, a UE may only identify a few dominant CSI-RS antenna ports. The dominant CSI-RS ports seen by a UE may vary across time. However, the variation is relatively slow, since the variation mainly depends on the UE mobility and the CSI-RS beam pattern used by eNB.

In the present disclosure, a UE can be configured to select $\tilde{p}$ out of P CSI-RS ports and feed back the corresponding port indices. Here, the P CSI-RS ports can be configured to the UE by means of non-zero-power (NZP) CSI-RS configuration. When the UE reports that the UE has selected $\tilde{p}$ dominant CSI-RS ports out of the P CSI-RS ports, the corresponding PMI, CQI and RI are derived and fed back under the assumption that the total number of CSI-RS ports is $\tilde{p}$. In other words, the eNB may assume that the UE has derived PMI, CQI and RI according to the legacy LTE specifications with total $\tilde{p}$ antenna ports. PTI can also be included in the UE reports, particularly when $\tilde{p}=8$. For simplicity of presentation, PTI is omitted hereafter. As used herein, the number of selected ports is referred to as selected port number (SPN) and the indices of selected ports are referred to as selected port indices (SPI).

With the CSI-RS transmission, the UE feedback report may need to include an indication of SPN, SPI, RI, PMI and CQI, where RI/PMI/CQI is derived in a different manner than conventional wide beam CSI-RS transmission. From eNB's perspective, RI/PMI/CQI needs to be interpreted jointly with SPN/SPI.

For example, assume that the UE is configured with 8 CSI-RS ports, and the feedback report specifies that SPN=2, SPI={16, 19}, RI=1, PMI=2 and CQI=10. The eNB interprets the feedback report as follows: if PDSCH is transmitted with applying precoder 2, i.e., $$\frac{1}{\sqrt{2}}\begin{bmatrix}1\\j\end{bmatrix}$$

in the 2-Tx codebook, on the CSI-RS ports {16, 19}, applying zero power in the other CSI-RS APs {15, 17, 18, 20, 21, 22} and MCS selected according to CQI index 10, then the UE is expected to achieve 10% block error probability for the PDSCH reception. Similarly, if the eNB can apply the equivalent precoder $$\frac{1}{\sqrt{2}}\begin{bmatrix}0\\1\\0\\0\\j\\0\\0\\0\end{bmatrix}$$

on the CSI-RS ports {15, 22} in the PDSCH transmission, the UE is expected to achieve 10% block error probability for the PDSCH reception.

In another example, assume that the UE is configured with 8 CSI-RS ports, and the feedback report specifies that SPN=2, SPI=116, 191, RI=2, PMI=2 and CQI={10, 8}. The eNB interprets the feedback report as follows: if PDSCH is transmitted with applying 2-layer precoder, i.e., $$\frac{1}{\sqrt{2}}\begin{bmatrix}1 & 0\\0 & 1\end{bmatrix}$$

in the 2-Tx codebook, on the CSI-RS ports {16, 19}, applying zero power in the other CSI-RS APs {15, 17, 18, 20, 21, 22} and MCS for 2 layers (2 codewords) selected according to CQI index 10 and 8 respectively, then the UE is expected to achieve 10% block error probability for the PDSCH reception. Similarly, if the eNB can apply the equivalent precoder $$\frac{1}{\sqrt{2}}\begin{bmatrix}0 & 0\\1 & 0\\0 & 0\\0 & 0\\0 & 1\\0 & 0\\0 & 0\\0 & 0\end{bmatrix}$$

on the CSI-RS ports {15, 22} in the PDSCH transmission, the UE is expected to achieve 10% block error probability for the PDSCH reception.

In a third example, assume that the UE is configured with 8 CSI-RS ports, and the feedback report specifies that SPN=4, SPI={16, 19, 20, 22}, RI=1, PMI=2 and CQI=10. The eNB interprets the feedback report as follows: if PDSCH is transmitted with applying precoder 2 in the 4-Tx codebook, i.e., $$\frac{1}{2}\begin{bmatrix} 1 \\ 1 \\ -1 \\ 1 \end{bmatrix}$$

on the CSI-RS ports {16, 19, 20, 22}, applying zero power in the other CSI-RS APs {15, 17, 18, 21} and MCS selected according to CQI index 10, then the UE is expected to achieve 10% block error probability for the PDSCH reception. Equivalently, if the eNB can apply the equivalent precoder $$\frac{1}{2}\begin{bmatrix} 0 \\ 1 \\ 0 \\ 0 \\ 1 \\ -1 \\ 0 \\ 1 \end{bmatrix}$$

on the CSI-RS ports {15, 22} in the PDSCH transmission, the eNB can expect to achieve 10% block error probability for the PDSCH reception.

In a fourth example, assume that the UE is configured with 8 CSI-RS ports, and the feedback report specifies that SPN=4, SPI={16, 19, 20, 22}, RI=2, PMI=2 and CQI={10, 8}. The eNB interprets the feedback report as follows: if PDSCH is transmitted with applying the 2-layer precoder in the 4-Tx codebook, i.e., $$\frac{1}{\sqrt{2}}\begin{bmatrix} 1 & 0 \\ -j & 0 \\ 0 & 1 \\ 0 & 1 \end{bmatrix}$$

on the CSI-RS ports {16, 19, 20, 22}, applying zero power in the other CSI-RS APs {15, 17, 18, 21} and MCS for 2 layers selected according to CQI index 10 and 8 respectively, then the UE is expected to achieve 10% block error probability for the PDSCH reception. Similarly, if the eNB can apply the equivalent precoder $$\frac{1}{2}\begin{bmatrix} 0 & 0 \\ 1 & 0 \\ 0 & 0 \\ 0 & 0 \\ -j & 0 \\ 0 & 1 \\ 0 & 0 \\ 0 & 1 \end{bmatrix}$$

on the CSI-RS ports {15, 22} in the PDSCH transmission, the UE is expected to achieve 10% block error probability for the PDSCH reception.

Advantages of the UE feedback report including an indication of SPN and SPI may include reduction in feedback overhead. For example, without selection, the UE may need to feed back PMI corresponding to P ports, while with selection the UE only may need to feed back PMI corresponding to p ports, where p may be much smaller than P. The feedback on port indices may not be needed as frequently as other information due to the slow variation, and thus may not induce much overhead. In another example, the present disclosure may significantly simplify the codebook design for high-dimension MIMO, i.e., eNB is equipped with many antennas (P>8), which enables reuse the existing codebooks designed for N=2, 4, 8. For example, assume P=32 and p=4. Then, instead of re-designing the codebook for 32 antenna ports, the present disclosure may, in some embodiments, reuse 3GPP LTE Release-8 2-Tx, 4-Tx and 8-Tx codebook. In yet another example, the complexity of UE may be reduced, because UE only needs to construct a feedback report based on p ports. In another example, embodiments of the present disclosure may lead to more efficient channel estimation relative to a wide CSI-RS beam. Intuitively, with a narrow CSI-RS beam as long as a UE finds the dominant ports, the UE roughly knows the channel, and while with wide CSI-RS ports, the UE cannot infer much of the UE's channel based on the information of dominant CSI-RS ports.

The present disclosure provides at least two methods for a UE to determine SPN/SPI. In one embodiment, the eNB configures either SPN or SPI or both via RRC signaling, or via setting a value in a field in a DCI format triggering an aperiodic CSI report, for example, as discussed with regard to Tables 5 and 6 below. In another embodiment, the UE selects preferred SPN and SPI, either separately or jointly; or the UE jointly selects SPN/SPI/CQI/RI/PMI.

For joint selection of SPN and SPI, the UE decides SPN and SPI jointly based on the received signal power from different antenna ports or the eNB decides SPN and SPI jointly based on UE reports of the received signal power from different antenna ports. While the example embodiments discussed below are described from the perspective of UE selection, the embodiments discussed below may also be based on eNB configuration of either SPN or SPI or both.

Figure 14:
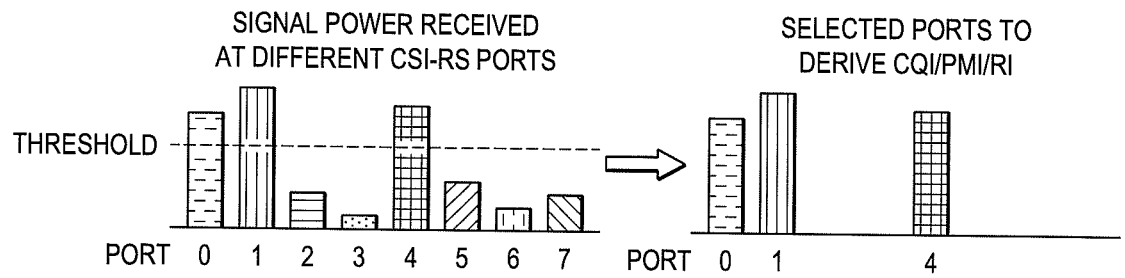
FIG. 14 illustrates an example of determination of SPN/SPI in accordance with an exemplary embodiment of the present disclosure.

FIG. 14 illustrates an example of determination of SPN/SPI in accordance with an exemplary embodiment of the present disclosure. In this exemplary embodiment, the UE selects the ports from which the signal power exceeds a threshold. The threshold is decided by the UE or configured by eNB. Conditioned on the selected antenna ports, the UE calculates CQI/PMI/RI. One example of this approach is illustrated in FIG. 14, where, based on the threshold, port 0, 1 and 4 are selected. If the selected number of antenna ports is not supported by the codebook, the threshold can be adjusted so that the selected number of CSI-RS ports is supported by the codebook. For example, threshold may be increased so that port 1 and port 4 are selected.

Figure 15:
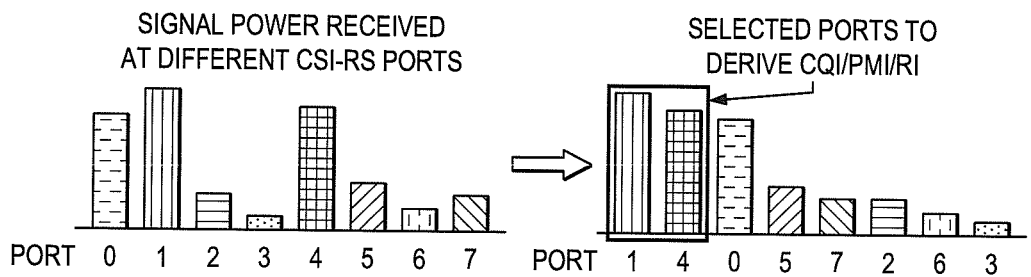
FIG. 15 illustrates another example of determination of SPN/SPI in accordance with another exemplary embodiment of the present disclosure.

FIG. 15 illustrates another example of determination of SPN/SPI in accordance with another exemplary embodiment of the present disclosure. In this exemplary embodiment, the UE first orders the ports based on their received power (in descending order), and then chooses the first $\tilde{p}$ antenna ports so that the sum power of the $\tilde{p}$ ports exceed a certain percentage of the total received power in all ports, for example, according to equation 1 below:

$$\frac{\text{Sum power of } \tilde{p} \text{ port}}{\text{Total power of } P \text{ port}} > \eta \qquad \text{[Equation 1]}$$

where $\eta \in (0,1)$ can be either decided by UE implementation or configured by eNB. Then, SPN=$\tilde{p}$ and SPI correspond to the port indices of the first p̂ ports. One example of this approach is illustrated in FIG. 15, where η=50% and ports 1 and 4 are selected.

Figure 16:
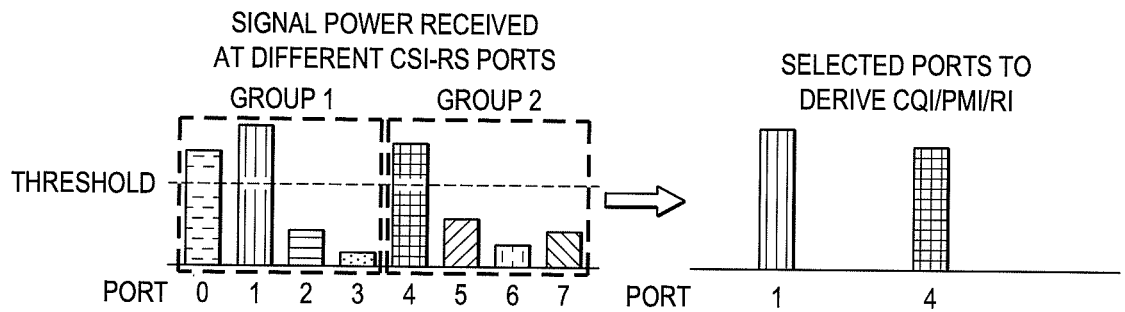
FIG. 16 illustrates another example of determination of SPN/SPI in accordance with another exemplary embodiment of the present disclosure.

FIG. 16 illustrates another example of determination of SPN/SPI in accordance with another exemplary embodiment of the present disclosure. In this exemplary embodiment, the UE groups P antenna ports in a certain manner. If the UE receives signal power larger than a threshold from more than one antenna ports within one group, the UE only selects the port with the largest power in that group. The threshold is decided by the UE. The group can be decided either by the UE or based on eNB configuration. In this example, given a fixed SPN, grouping increases the possibility of the UE selecting ports that have distinct direction and thus increases the possibilities of higher rank transmission. One example of this approach is illustrated in FIG. 16 where there are two groups. In Group 1, two antenna ports exceed the threshold, but the UE only selects the stronger port 1.

For joint selection of SPN, SPI, PMI, RI and CQI, the UE decides SPN/SPI jointly together with other CSI (CQI, RI and PMI). In this example, the UE may calculate CQI and PMI for all the possible combinations of port selection, and then select the PMI/SPN/SPI associated with the best CQI. However, the UE may use other methods to calculate these values to reduce complexity.

Figure 17:
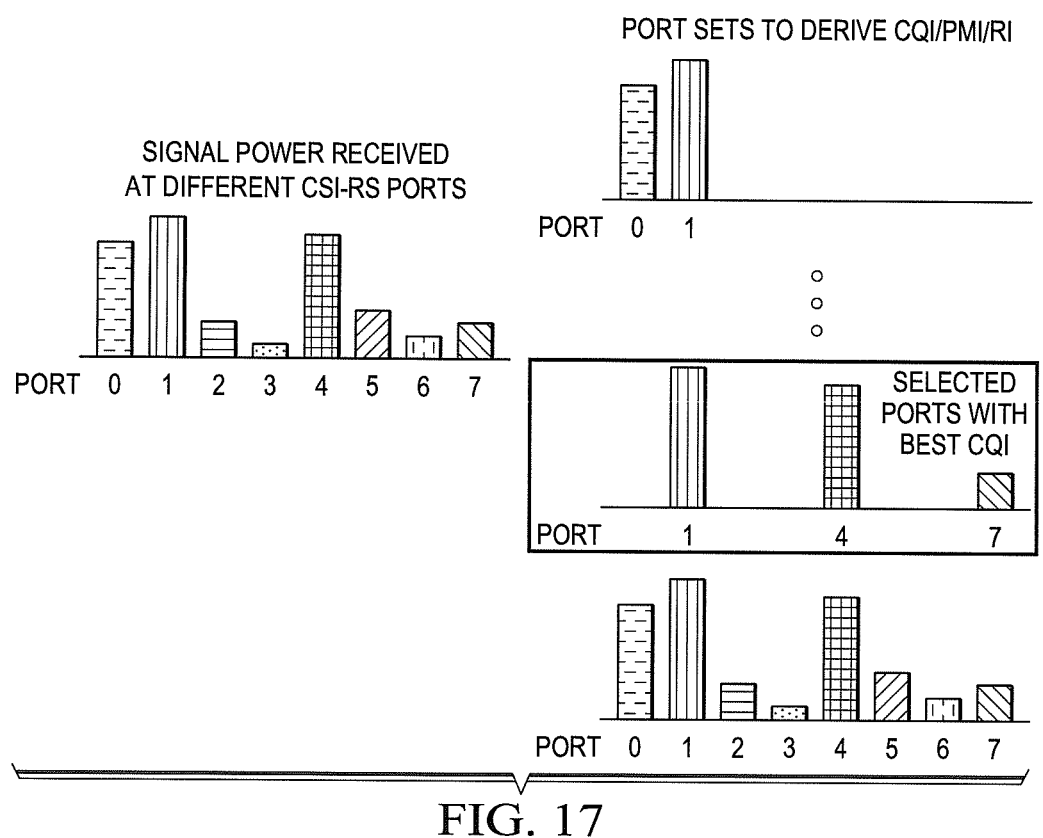
FIG. 17 illustrates another example of determination of SPN/SPI in accordance with another exemplary embodiment of the present disclosure.

FIG. 17 illustrates another example of determination of SPN/SPI in accordance with another exemplary embodiment of the present disclosure. In this exemplary embodiment, the UE calculates CQI and PMI conditioned on each of all possible combinations of ports selection and then select the CQI/PMI/SPN/SPI associated with the best CQI. One example of this approach is illustrated in FIG. 17. It is not true that selecting all antenna ports yields the best CQI. This is because in LTE/LTE-A, the eNB is subject to constant power modulation, i.e., codewords in current codebooks are constant-modulus. In other words, the eNB may need to equally allocate power to all the ports transmitted to the UE, and therefore, the UE may prefer to not select ports receiving a smaller signal power.

Figure 18:
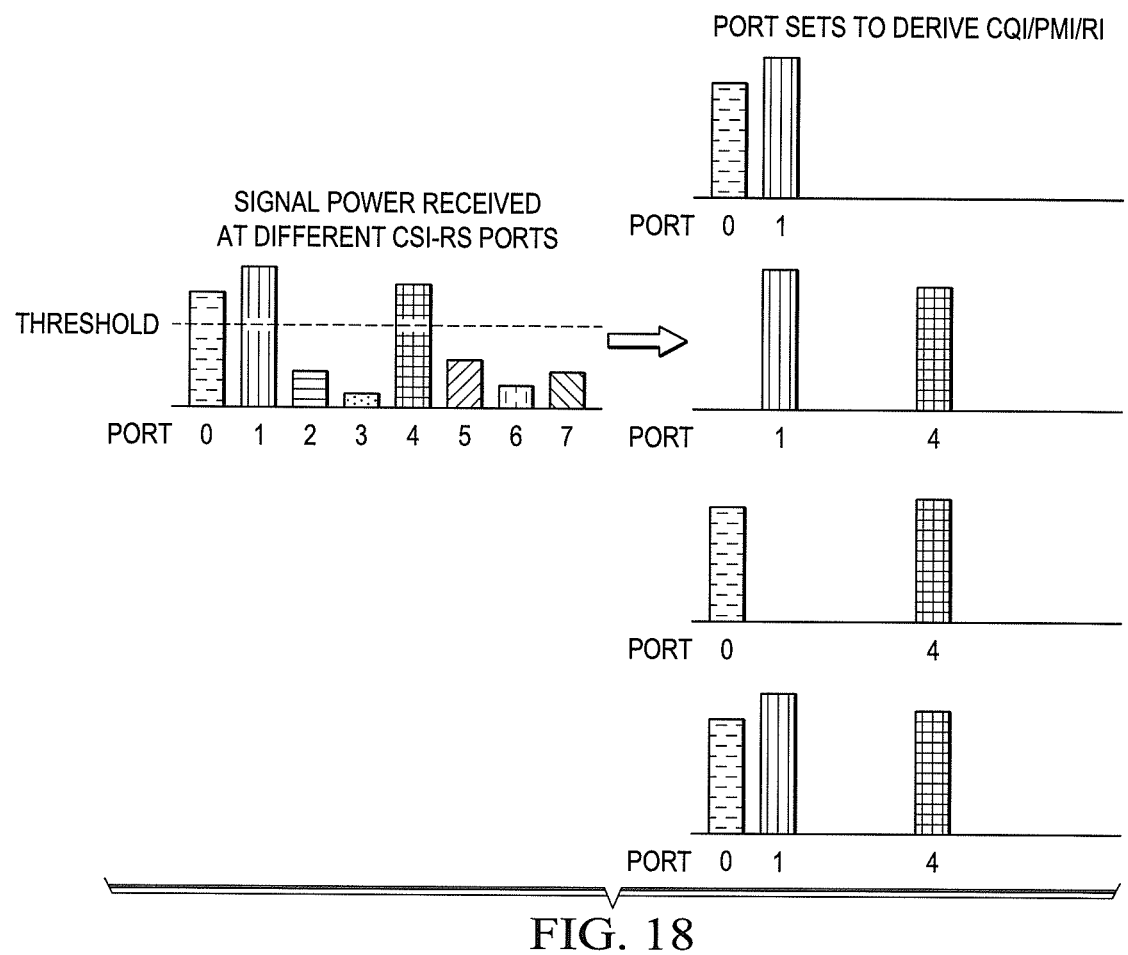
FIG. 18 illustrates another example of determination of SPN/SPI in accordance with another exemplary embodiment of the present disclosure.

FIG. 18 illustrates another example of determination of SPN/SPI in accordance with another exemplary embodiment of the present disclosure. In this exemplary embodiment, the UE may pre-select some antenna ports based on either one of the embodiments discussed above with regard to FIGS. 14, 15, and 16. Then, the UE calculates CQI and PMI conditioned on each of all possible combinations of ports whose received signal power exceeds a certain threshold. This threshold is decided by the UE. Then, the UE selects the PMI/SPN/SPI associated with the best CQI. One advantage of the embodiment discussed above with regard to FIG. 15 over that discussed with regard to FIG. 14 in this exemplary embodiment is that the complexity may be reduced due to the smaller search space.

For higher-layer (e.g., RRC) configuration by eNB, the eNB configures SPN for the UE. Based on this configuration (e.g., constraint), the UE may apply any one of the embodiments discussed above with regard to FIGS. 14-18 to derive SPI/CQI/PMI/RI. SPN is signaled by eNB via RRC signaling or is set by a value in the CSI request field in a DCI format triggering an aperiodic CSI report. Table 5 below provides an example CSI request table.

TABLE 5

CSI Request field for PDCCH/EPDCCH with uplink DCI format in UE specific search space

| Value of CSI request field | Description |
|---|---|
| '00' | No aperiodic CSI report is triggered |
| '01' | UE selected SPN/SPI |
| '10' | A first higher-layer configured value for SPN |
| '11' | A second higher-layer configured value for SPN |

In this example, if the CSI request field is set to be '01', then the UE may apply any one of the embodiments discussed above with regard to FIGS. 14-18 to determine SPN/SPI. If the CSI request field is set to be '10', the UE uses the first value of configured SPN, e.g., SPN=1 to determine SPI/CQI/PMI/RI. If the CSI request field is set to be '11', the UE uses the second value of configured SPN, e.g., SPN=2.

In another exemplary embodiment, the eNB configures multiple combinations (or sets) of SPN and SPI. Then, the UE calculates CQI/PMI/RI based on each of the configurations, and then selects the one with the best CQI. SPN is signaled by eNB via RRC signaling or is set by a value in the CSI request field in a DCI format triggering an aperiodic CSI report. Table 6 below provides an example CSI request table.

TABLE 6

CSI Request field for PDCCH/EPDCCH with uplink DCI format in UE specific search space

| Value of CSI request field | Description |
|---|---|
| '00' | No aperiodic CSI report is triggered |
| '01' | UE selected SPN/SPI |
| '10' | A first higher-layer configured SPN/SPI set |
| '11' | A second higher-layer configured SPN/SPI set |

In this example, if the CSI request field is set to be '01', then the UE may apply any one of the embodiments discussed above with regard to FIGS. 14-18 to determine SPN/SPI. If the CSI request field is set to be '10', the UE uses the first value of configured SPN, e.g., SPN=1, SPI=0 to derive CQI/PMI/RI. If the CSI request field is set to be '11', the UE uses the second value of configured SPN, e.g., SPN=2, SPI={0,2}.

The present provides various mechanisms for feedback of SPN/SPI. In one exemplary embodiment, a UE may provide full feedback with an SPI bitmap. In this example, the UE selects a port index bitmap ($p_0, \ldots, p_{P-1}$) where $p_i=1$ means that CSI-RS port i. A total of P bits are used. In this example, SPN corresponds to the number of 1s in the SPI bitmap.

In another exemplary embodiment, a UE may provide separate feedback fields for SPN and SPI. In this example, SPN and SPI are fed back separately, and certain compression can be applied to feedback SPI conditioned on SPN. In an example of higher layer configured SPN, there is no need to feedback SPN and hence SPN is not fed back. Conditioned on SPN=p, $\lceil \log_2(C_p^P) \rceil$ bits are needed to feed back SPI assuming total P CSI-RS ports are transmitted, where $C_p^P$ is the total number of combinations to choose p indices out of P distinct indices, P>p. For example, if P=8, then the bits needed to feed back SPI conditioned on SPN may be provided according to Table 7 below.

TABLE 7

| P | SPN | Number of SPI bits |
|---|-----|--------------------|
| 8 | 1   | 3                  |
|   | 2   | 5                  |
|   |     | 7                  |
| 4 | 1   | 2                  |
|   | 2   | 3                  |
| 2 | 1   | 1                  |
|   | 2   | N/A                |

In an example of UE selected SPN, 2 bits are used to feed back SPN that takes value of {1, 2, 4, 8}. If SPI/SPN is calculated based on the embodiments discussed above with regard to FIG. 16, Table 5, or Table 7 (i.e., certain antenna grouping is applied and this grouping is configured by eNB), then compression can be applied to reduce bits for SPI feedback.

In another exemplary embodiment, a UE may use a joint field for SPN and SPI (i.e., a selected port number and index (SPNI) index). This embodiment may be used when the eNB configures a set of combinations of SPN and SPI, where each of the combination has a unique index. Then, the UE selects the combination of SPN/SPI and feeds back the index associated with the combination of SPN/SPI. Table 8 below illustrates one example of joint SPN/SPI feedback.

TABLE 8

|            | P = 8 | | P = 4 | |
|------------|-----|------|-----|------|
| SPNI index | SPN | SPI  | SPN | SPI  |
| 0          | 1   | 0    | 1   | 0    |
| 1          | 1   | 2    | 1   | 1    |
| 2          | 1   | 4    | 1   | 2    |
| 3          | 1   | 6    | 1   | 3    |
| 4          | 2   | (0, 2) | 2 | (0, 2) |
| 5          | 2   | (1, 3) | 2 | (1, 3) |
| 6          | 2   | (2, 4) |   |      |
| 7          | 2   | (3, 5) |   |      |
| 8          | 2   | (4, 6) |   |      |
| 9          | 2   | (5, 7) |   |      |

This embodiment allows exploiting the correlation of SPN/SPI to reduce the feedback overhead by constructing combinations of SPN/SPI that have a large possibility to occur or have a large benefit from this port selection procedure. For example, this embodiment may eliminate or reduce the need for reporting adjacent ports, e.g., (0, 1) or (2, 3), where the beam patterns of the two ports may have large overlap and thus may cause large interference. In addition, this embodiment provides that the largest value for SPN, (i.e., $p_{max}$, which is 2 in this example) can be configured to be less than the number of CSI-RS ports 'P', i.e., $p_{max}<P$. In practice, high rank transmissions (e.g., RI>2) are not often, which implies a small possibility of the UE receiving significant power from many well separated ports (e.g., SPN>2). Under realistic propagation conditions, with high probability, the number of paths (e.g., clusters) that have large power is less than the number of CSI-RS ports and may be configured to be 4, 8 or greater.

In another exemplary embodiment, SPN is not explicitly fed back, and RI is coupled with SPN, e.g., SPN=RI. For example, in most practical scenarios, transmissions with rank higher than 4 are not common, and in this case, RI and SPI are expected to be highly correlated. The effective rank of the channel matrix (e.g. the number of eigenvalues that are sufficiently large), which can be roughly indicated by RI, may correspond to the number of ports from which the UE receives significant power. The beamwidth of each CSI-RS port is narrow so that only one dominant path can be distinguished from each port (i.e., each port alone can only support rank-1 transmission). Table 9 below illustrates an example of RI coupled with SPN.

TABLE 9

| RI | SPN |
|----|-----|
| 1  | 1   |
| 2  | 2   |
| 3  | 3   |
| 4  | 4   |

In this exemplary embodiment, the UE derives SPI and CQI based on the assumption that an identity precoding matrix is applied during PDSCH transmission, and equal power is allocated to all the selected antenna ports. No explicit PMI is fed back. Here, the interpretation of SPI depends on the signaled value of RI (=SPN). For example, similarly to the embodiment discussed above with regard to FIG. 15, the number of bits to be assigned for SPI is dependent upon the concurrently signaled RI value in case of aperiodic feedback, or the lastly reported RI value in case of periodic feedback. One example relationship between RI and a number of SPI bits is illustrated in Table 10 below.

TABLE 10

| P | RI (=SPN) | Number of SPI bits |
|---|-----------|--------------------|
| 8 | 1         | 3                  |
|   | 2         | 5                  |
|   | 3         | 6                  |
|   | 4         | 7                  |
| 4 | 1         | 2                  |
|   | 2         | 3                  |
|   | 3         | 2                  |
|   | 4         | 1                  |
| 2 | 1         | 1                  |
|   | 2         | N/A                |

For example, assume that the UE is configured with 8 CSI-RS ports, and the feedback report specifies that RI=2, SPI={16, 19}, PMI=2 and CQI={10, 8}. The eNB interprets the feedback report as follows: if PDSCH is transmitted with applying 2-layer precoder, i.e., $$\frac{1}{\sqrt{2}}\begin{bmatrix} 1 & 0 \\ 0 & 1 \end{bmatrix}$$

in the 2-Tx codebook, on the CSI-RS ports {16, 19}, applying zero power in the other CSI-RS APs {15, 17, 18, 20, 21, 22} and MCS for 2 layers (2 codewords) selected according to CQI index 10 and 8 respectively, then the UE is expected to achieve 10% block error probability for the PDSCH reception. Similarly, if the eNB can apply the equivalent precoder $$\frac{1}{\sqrt{2}} \begin{bmatrix} 0 & 0 \\ 1 & 0 \\ 0 & 0 \\ 0 & 0 \\ 0 & 1 \\ 0 & 0 \\ 0 & 0 \\ 0 & 0 \end{bmatrix}$$

on the CSI-RS ports {15, 22} in the PDSCH transmission, the UE is expected to achieve 10% block error probability for the PDSCH reception.

Alternatively, RI and SPI can be jointly coded. One example for P=4 is illustrated in Table 11 below.

TABLE 11

| RI/SPI index | P = 4 | |
|---|---|---|
| | RI (=SPN) | SPI |
| 0 | 1 | 0 |
| 1 | 1 | 1 |
| 2 | 1 | 2 |
| 3 | 1 | 3 |
| 4 | 2 | (0, 2) |
| 5 | 2 | (1, 3) |
| 6 | 2 | (0, 1) |
| 7 | 2 | (1, 2) |
| 8 | 2 | (2, 3) |
| 9 | 2 | (3, 0) |
| 10 | 3 | (0, 1, 2) |
| 11 | 3 | (1, 2, 3) |
| 12 | 3 | (2, 3, 0) |
| 13 | 3 | (3, 0, 1) |
| 14 | 4 | (0, 1, 2, 3) |

Various embodiments of the present disclosure provide aperiodic CSI Reporting using PUSCH. In one embodiment, the eNB configures the UE with P CSI-RS ports, and the UE has M antennas. The UE measures channels to the P CSI-RS ports, $h_0, \ldots, h_{P-1}$, where $h_i \in C^M$ may be frequency-selective.

For feedback of SPI, in aperiodic CSI reporting using PUSCH, a UE is semi-statically configured by higher layers to feed back CQI and PMI and corresponding RI and SPI on the same PUSCH using one of the following CSI reporting modes given in Table 7.2.1-1 in R1-125404, 3GPP TS 36.213 CR and described below. The UE selects the SPI for the entire band or subband, and derives PMI, RI and CQI according to the selected SPN and SPI either in wideband or subband. SPN/SPI is reported for all transmission modes. The reporting modes can be configured with either multiple (subband) SPN and SPI or single (wideband) SPN and SPI.

Considering the importance and corresponding reliability requirements for SPN and SPI, embodiments of the present disclosure provide that SPI is jointly coded with CQI/PMI for the configured serving cells (or for the configured CSI processes). The jointly coded bits are mapped to the CQI/PMI region of the PUSCH. Before entering the channel coding block, the SPI information bits for a serving cell (or a CSI process) are either appended or preceded to the corresponding CQI/PMI information bits. Additionally, SPN is jointly coded with RI for serving cells (or for each CSI process). The jointly coded bits are mapped to the RI region of the PUSCH. Before entering the channel coding block, the SPN information bits for a serving cell (or a CSI process) are either appended or preceded to the corresponding RI information bits. In this exemplary embodiment, the UCI may be mapped on the PUSCH according to FIG. 19.

Figure 19:
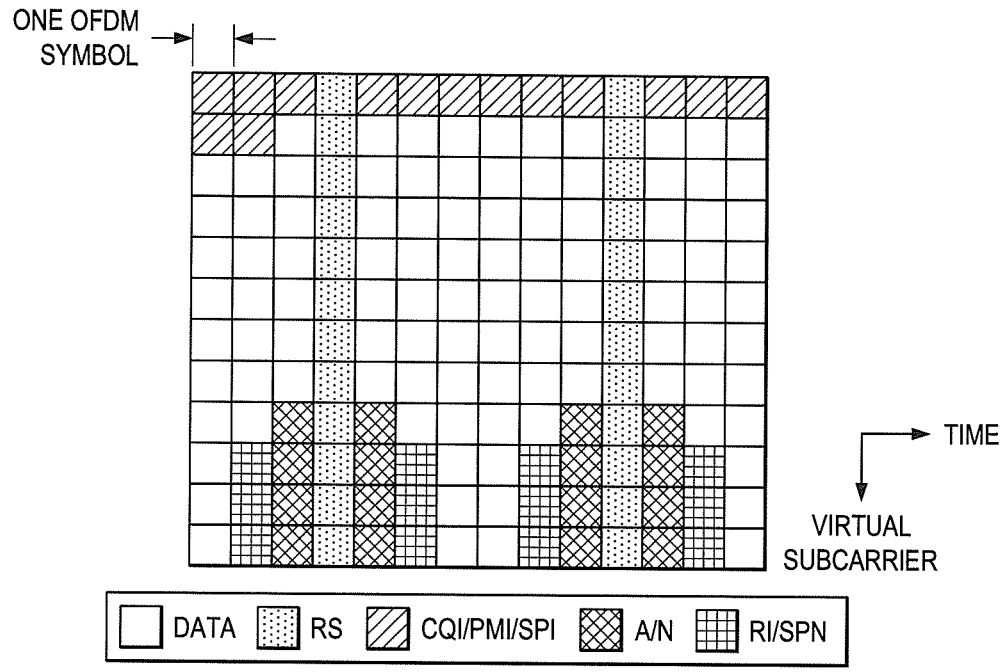
FIG. 19 illustrates uplink control information (UCI) mapping on PUSCH in accordance with an exemplary embodiment of the present disclosure.

FIG. 19 illustrates uplink control information (UCI) mapping on PUSCH in accordance with an exemplary embodiment of the present disclosure.

Table 12 below illustrates CQI and PMI Feedback Types for PUSCH CSI reporting modes.

TABLE 12

| | | PMI Feedback Type | | |
|---|---|---|---|---|
| | | No PMI | Single PMI | Multiple PMI |
| Feedback Type | Wideband (wideband CQI) | | | Wideband/ subband SPN/SPI Mode 1-2 |
| | UE Selected (subband CQI) | | Wideband/ subband SPN/SPI Mode 2-0 | Wideband/ subband SPN/SPI Mode 2-2 |
| PUSCH CQI | Higher Layer-configured (subband CQI) | Wideband/ Subband SPN/SPI Mode 3-0 | Wideband SPN/SPI Mode 3-1 | |

Figure 20:
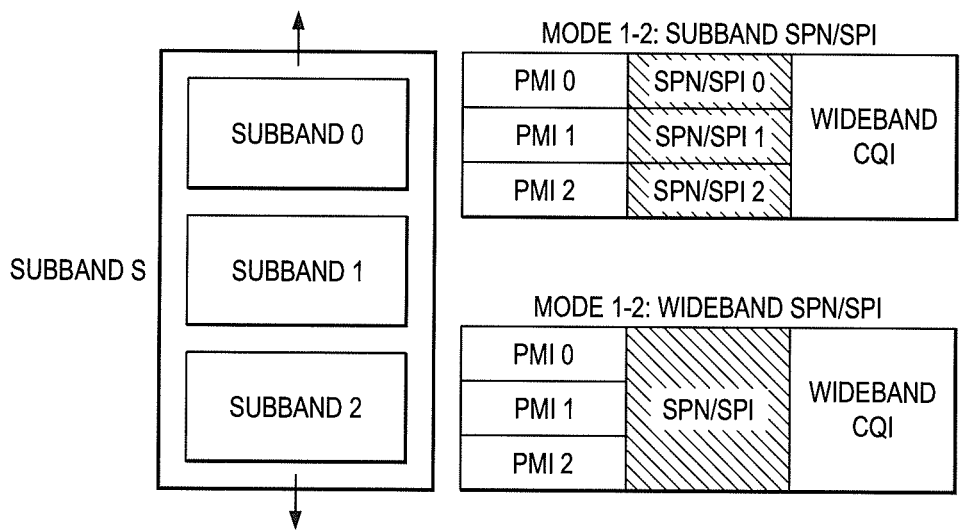
FIG. 20 illustrates SPN/SPI feedback in a wideband feedback mode in accordance with various embodiments of the present disclosure.

FIG. 20 illustrates SPN/SPI feedback in a wideband feedback mode in accordance with various embodiments of the present disclosure. For wideband feedback, in feedback Mode 1-2, the feedback of SPI, if configured, and SPN can be either subband or wideband. In case of subband SPI/SPN, the UE calculates and feeds back SPI/SPN for each of the subbands. In case of wideband SPI/SPN, the UE calculates SPI/SPN based on the S subband and then feeds back a single SPI/SPN.

Figure 21:
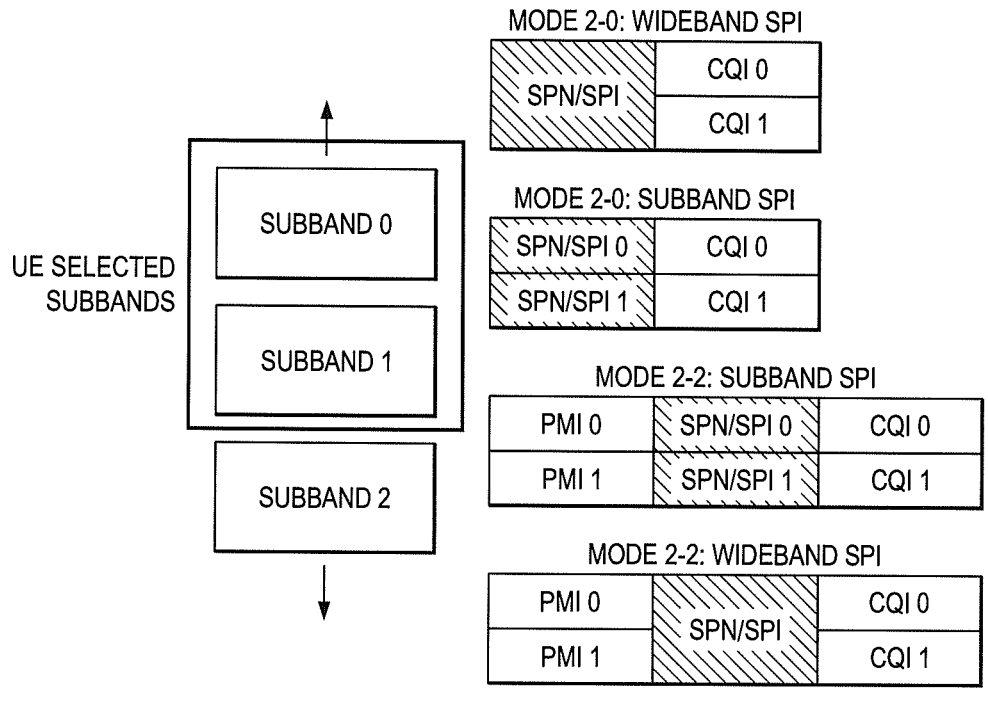
FIG. 21 illustrates SPN/SPI feedback in UE selected subband feedback modes in accordance with various embodiments of the present disclosure.

FIG. 21 illustrates SPN/SPI feedback in UE selected subband feedback modes in accordance with various embodiments of the present disclosure. In feedback Mode 2-0, the feedback of SPI, if configured, and SPN can be either subband or wideband. In case of subband SPI/SPN, the UE calculates and feeds back SPI/SPN for each of the UE selected subband. In case of wideband SPI/SPN, the UE calculates SPI/SPN based on the entire selected subbands and then feeds back a single SPI/SPN. In this case, SPI/SPN can be used as a "coarse PMI" for eNB precoding or beamforming.

In feedback Mode 2-2, the feedback of SPI, if configured, and SPN can be either subband or wideband. In case of subband SPI/SPN, the UE calculates and feeds back SPI/SPN for each of the UE selected subband. In case of wideband SPI/SPN, the UE calculates SPI/SPN based on the entire selected subbands and then feeds back a single SPI/SPN. In this case, SPI/SPN can be jointly used with PMI for eNB precoding or beamforming.

Figure 22:
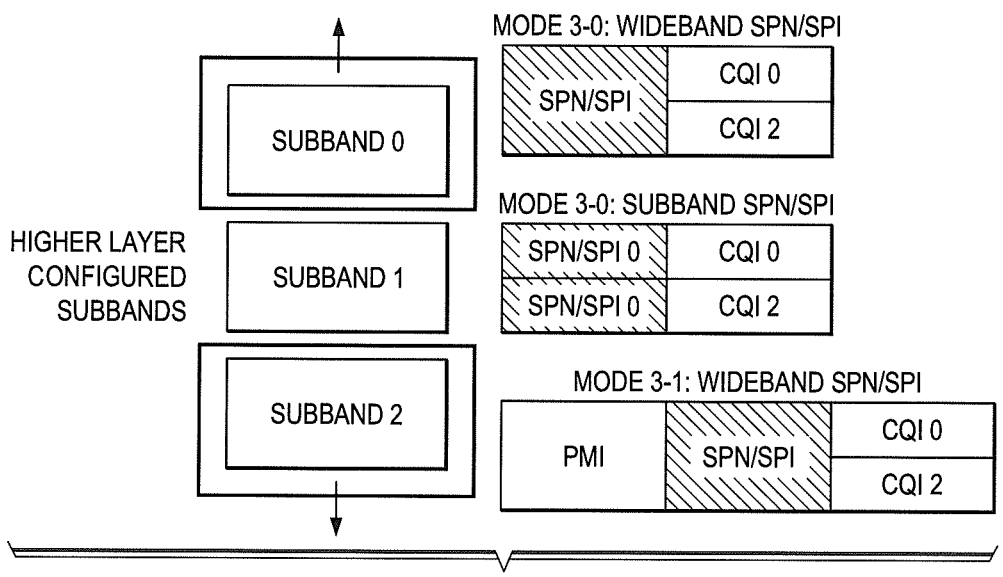
FIG. 22 illustrates SPN/SPI feedback in higher layer configured feedback modes in accordance with various embodiments of the present disclosure.

FIG. 22 illustrates SPN/SPI feedback in higher layer configured feedback modes in accordance with various embodiments of the present disclosure. In feedback Mode 3-0, the feedback of SPI, if configured, and SPN can be either subband or wideband. In case of subband SPI/SPN, the UE calculates and feeds back SPI/SPN for each higher layer configured subbands. In case of wideband SPI/SPN, the UE calculates SPI/SPN based on the entire higher layer configured subbands and then feeds back a single SPI/SPN. In this case, SPN/SPI can be used as a "coarse PMI" for eNB precoding or beamforming.

In feedback Mode 3-1, the feedback of SPI, if configured, and SPN can be wideband. The UE calculates SPI/SPN based on the entire higher layer configured subbands and then feeds back a single SPI/SPN. In this case, SPN/SPI can be jointly used with PMI for eNB precoding or beamforming.

With the CSI-RS transmission described herein, the present disclosure provides the following based on R1-125404, 3GPP TS 36.213 CR. The UE derives RI, PMI and CQI by assuming that the data is only transmitted on a subset of CSI-RS ports while the ports not included in the subset is not used for transmission (zero-power). The codebook that the UE uses is determined by the number of antenna ports in the subset. For example, if the UE is configured with 8 CSI-RS ports, {15, and 22} and calculates RI/PMI/CQI conditioning on ports {16, 19}, the UE assumes that PDSCH is only transmitted via ports {16, 19} and all the other ports {15, 17, 18, 20, 21, 22} are not used. The UE calculates RI/PMI/CQI by using the codebook for 2 antenna ports. The CQI indices and their interpretations are given in Table 7.2.3-1 of R1-125404, 3GPP TS 36.213 CR.

Based on an unrestricted observation interval in time and frequency, the UE derives, for each CQI value reported in uplink subframe n, the highest CQI index between 1 and 15 in Table 7.2.3-1 of R1-125404, 3GPP TS 36.213 CR which satisfies the following condition, or CQI index 0 if CQI index 1 does not satisfy the condition: a single PDSCH transport block with a combination of port selection (SPN and SPI), modulation scheme and transport block size corresponding to the CQI index, and occupying a group of downlink physical resource blocks termed the CSI reference resource, may be received with a transport block error probability not exceeding 0.1.

When a UE is configured to report SPN/SPI, the UE selects $\tilde{p}$ out of P configured CSI-RS ports, e.g., ports $\{P_0 \ldots P_{\tilde{p}-1}\}$ where $P_i \in \{15 \ldots 14+P\}$, i=0, ..., $\tilde{p}-1$. Conditioned on the selected $\tilde{p}$ ports, the UE assumes the following for the purpose of deriving the CQI index, and if also configured, PMI and RI: 1) the first 3 OFDM symbols are occupied by control signaling, 2) no resource elements used by primary or secondary synchronization signals or PBCH, 3) CP length of the non-MBSFN subframes, 4) redundancy version 0, and 5) if CSI-RS is used for channel measurements, the ratio of PDSCH EPRE to CSI-RS EPRE is as given in Section 7.2.5 of R1-125404, 3GPP TS 36.213 CR.

For transmission mode 9 CSI reporting: CRS REs are as in non-MBSFN subframes; and if the UE is configured for PMI/RI reporting, the UE-specific reference signal overhead is consistent with the most recent reported rank; and PDSCH signals on antenna ports $\{7 \ldots 6+\upsilon\}$ for $\upsilon$ layers may result in signals equivalent to corresponding symbols transmitted on antenna ports $\{P_0 \ldots P_{\tilde{p}-1}\}$, as given by $$\begin{bmatrix} y^{(P_0)}(i) \\ \vdots \\ y^{(P_{\tilde{p}-1})}(i) \end{bmatrix} = W(i) \begin{bmatrix} x^{(0)}(i) \\ \vdots \\ x^{(\upsilon-1)}(i) \end{bmatrix},$$

where $x(i)=[x^{(0)}(i) \ldots x^{(\upsilon-1)}(i)]^T$ is a vector of symbols from the layer mapping in section 6.3.3.2 of R1-125402, 3GPP TS 36.211 CR, $P \in \{1:\tilde{p}\}$, where $\tilde{p}$ is the maximum available CSI-RS ports, and P is the number of CSI-RS ports configured, and if only one CSI-RS port is configured, W(i) is 1 and the UE-specific reference signal overhead is 12 REs; if more than one CSI-RS ports are configured, W(i) is the precoding matrix corresponding to the reported PMI applicable to x(i). The corresponding PDSCH signals transmitted on antenna ports $\{P_0 \ldots P_{\tilde{p}-1}\}$ have a ratio of EPRE to CSI-RS EPRE equal to the ratio given in section 7.2.5

For transmission mode 10 CSI reporting, if a CSI process is configured without PMI/RI reporting: if $\tilde{p}$ is one, a PDSCH transmission is on a single-antenna port, port 7. The channel on antenna port {7} is inferred from the channel on antenna port {15} of the associated CSI-RS resource. CRS REs are as in non-MBSFN subframes. The UE-specific reference signal overhead is 12 REs per PRB pair. Otherwise, if $\tilde{p}$ is 2, the PDSCH transmission scheme assumes the transmit diversity scheme defined in section 7.1.2 in R1-125404, 3GPP TS 36.213 CR on antenna ports {0, 1} except that the channels on antenna ports {0, 1} are inferred from the channels on antenna port $\{P_0, P_1\}$ of the associated CSI resource respectively. If $\tilde{p}$ is 4, the PDSCH transmission scheme assumes the transmit diversity scheme defined in section 7.1.2 in R1-125404, 3GPP TS 36.213 CR on antenna ports {0,1,2,3} except that the channels on antenna ports {0,1,2,3} are inferred from the channels on antenna ports $\{P_0, P_1, P_2, P_3\}$ of the associated CSI-RS resource, respectively. The UE is not expected to be configured with more than 4 antenna ports for the CSI-RS resource associated with the CSI process configured without PMI/RI reporting. The overhead of CRS REs is assuming the same number of antenna ports as that of the associated CSI-RS resource. UE-specific reference signal overhead is zero.

For transmission mode 10 CSI reporting, if a CSI process is configured with PMI/RI reporting: CRS REs are as in non-MBSFN subframes; the UE-specific reference signal overhead is consistent with the most recent reported rank; and PDSCH signals on antenna ports $\{7 \ldots 6+\upsilon\}$ for $\upsilon$ layers may result in signals equivalent to corresponding symbols transmitted on antenna ports $\{P_0 \ldots P_{\tilde{p}-1}\}$ as given by $$\begin{bmatrix} y^{(P_0)}(i) \\ \vdots \\ y^{(P_{\tilde{p}-1})}(i) \end{bmatrix} = W(i) \begin{bmatrix} x^{(0)}(i) \\ \vdots \\ x^{(\upsilon-1)}(i) \end{bmatrix},$$

where $x(i)=[x^{(0)}(i) \ldots x^{(\upsilon-1)}(i)]^T$ is a vector of symbols from the layer mapping in section 6.3.3.2 of R1-125402, 3GPP TS 36.211 CR, $P \in \{1:\tilde{p}\}$, where $\tilde{p}$ is the number of antenna ports of the associated CSI-RS resource, and if P=1, W(i) is 1 and the UE-specific reference signal overhead is 12 REs; if P>1, W(i) is the precoding matrix corresponding to the reported PMI applicable to x(i). The corresponding PDSCH signals transmitted on antenna ports $\{P_0 \ldots P_{\tilde{p}-1}\}$ may have a ratio of EPRE to CSI-RS EPRE equal to the ratio given in section 7.2.5. Moreover, the UE assumes no REs allocated for CSI-RS and zero-power CSI-RS, no REs allocated for PRS and the PDSCH transmission scheme given by Table 7.2.3-0 of R1-125404, 3GPP TS 36.213 CR depending on the transmission mode currently configured for the UE (which may be the default mode). If CRS is used for channel measurements, the ratio of PDSCH EPRE to cell-specific RS EPRE is as given in Section 5.2 of R1-125404, 3GPP TS 36.213 CR with the exception of $\rho_A$ which is assumed to be: i) $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one; or ii) $\rho_A = P_A + \Delta_{offset}$ [dB] for any modulation scheme and any number of layers, otherwise. The shift $\Delta_{offset}$ is given by the parameter non-PDSCH-RS-EPRE-Offset which is configured by higher-layer signaling.

In the above description, it is assumed that a UE can be configured to feed back SPN/SPI even when the UE is configured with TM 9 or TM 10. In order to reduce interference with the legacy operation, the present disclosure provides that a UE calculates CQI/PMI/RI based upon the following assumption only when the UE is configured with a new TM associated with SPI/SPN feedback (for FD-MIMO). Conditioned on the selected p̃ ports, the UE assumes the following for the purpose of deriving the CQI index, and if also configured, PMI and RI: i) CRS REs are as in non-MBSFN subframes; and ii) the UE-specific reference signal overhead is consistent with the most recent reported rank; and PDSCH signals on antenna ports $\{7 \ldots 6+\upsilon\}$ for $\upsilon$ layers may result in signals equivalent to corresponding symbols transmitted on antenna ports $\{P_0 \ldots P_{\tilde{p}-1}\}$, as given by $$\begin{bmatrix} y^{(P_0)}(i) \\ \vdots \\ y^{(P_{\tilde{p}-1})}(i) \end{bmatrix} = W(i) \begin{bmatrix} x^{(0)}(i) \\ \vdots \\ x^{(\upsilon-1)}(i) \end{bmatrix},$$

where $x(i) [x^{(0)}(i) \ldots x^{(\upsilon-1)}(i)]^T$ is a vector of symbols from the layer mapping in section 6.3.3.2 of R1-125402, 3GPP TS 36.211 CR, $P \in \{1:\tilde{p}\}$, where is the number of antenna ports of the associated CSI-RS resource, and if P=1, W(i) is 1 and the UE-specific reference signal overhead is 12 REs; if P>1, W(i) is the precoding matrix corresponding to the reported PMI applicable to x(i). The corresponding PDSCH signals transmitted on antenna ports $\{P_0 \ldots P_{\tilde{p}-1}\}$ may have a ratio of EPRE to CSI-RS EPRE equal to the ratio given in section 7.2.5.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing feedback by a user equipment (UE) in a wireless communication system, the method comprising:
    measuring signals received on a plurality of channel state information reference signal (CSI-RS) ports;
    selecting a plurality of combinations of the CSI-RS ports;
    applying a plurality of precoding matrixes to each of the selected combinations of CSI-RS ports;
    calculating channel quality indicator (CQI) values for each of the applications of precoding matrixes to each of the selected combinations of CSI-RS ports;
    selecting a selected port number (SPN), a selected port index (SPI), a precoding matrix indicator (PMI) corresponding to one of the plurality of precoding matrixes, and a rank indicator (RI) that yields a highest CQI from among the calculated CQI values, wherein the SPN is a number of selected CSI-RS ports and is equal to the RI, and wherein the SPI includes indices of the selected CSI-RS ports; and
    sending feedback indicating the SPI, the highest CQI value, the PMI, and at least one of the SPN or the RI.

2. The method of claim 1 further comprising determining the SPN as the number of CSI-RS ports to select based on at least one of the calculated CQI values or a grouping of the CSI-RS ports.

3. The method of claim 1, wherein selecting the SPN and the SPI comprises:
    when the SPN and the SPI are calculated by the UE, selecting a number of CSI-RS ports whose signal power exceeds a threshold, selecting a number of CSI-RS ports whose total sum power exceed a threshold, or selecting a number of CSI-RS ports where each port is from a group of CSI-RS ports and received power exceed a threshold,
    wherein the UE is configured to calculate the CQI values based on the selected SPN and the SPI, and
    wherein the threshold is determined by the UE or configured by a base station.

4. The method of claim 1, wherein:
    the UE is configured to calculate the CQI values based on each of the plurality of the CSI-RS ports selection and select the CQI/PMI/SPN/SPI associated with a particular CQI, or calculate the CQI values and the PMI based on each of the plurality of possible combinations of CSI-RS ports whose received power exceeds the threshold and select the CQI/PMI/SPN/SPI associated with the highest CQI value, and
    the threshold is determined by the UE or configured by a base station.

5. The method of claim 1, wherein when the SPN is configured for the UE, selecting the number of the CSI-RS ports comprises selecting the number of the CSI-RS ports according to a value of the SPN configured for the UE.

6. The method of claim 1, wherein when SPN/SPI sets are configured for the UE, selecting the number of the CSI-RS ports comprises selecting a SPN/SPI set from the configured SPN/SPI sets based on the calculated CQI values.

7. The method of claim 1, wherein sending the feedback comprises sending the feedback including both the SPN and the SPI for each of the selected CSI-RS ports.

8. The method of claim 1, wherein sending the feedback indicating at least the SPI for each of the selected CSI-RS ports comprises:
    jointly encoding the SPN and the SPI using a selected port number and index (SPNI) index; and
    sending the feedback including the SPNI index, wherein the SPN is fed back implicitly based on the SPN being equal to the RI.

9. An apparatus in a user equipment (UE) configured to provide feedback in a wireless communication system, the apparatus comprising:
    a controller configured to measure signals received on a plurality of channel state information reference signal (CSI-RS) ports; select a plurality of combinations of the CSI-RS ports; apply a plurality of precoding matrixes to each of the selected combinations of CSI-RS ports; calculate channel quality indicator (CQI) values for each of the applications of precoding matrixes to each of the selected combinations of CSI-RS ports selection; and select a selected port number (SPN), a selected port index (SPI), a precoding matrix indicator (PMI) corresponding to one of the plurality of precoding matrixes, and a rank indicator (RI) that yields a highest CQI from among the calculated CQI values, wherein the SPN is a number of selected CSI-RS ports and is equal to the RI, and wherein the SPI includes indices of the selected CSI-RS ports; and
    a transmitter configured to send feedback indicating the SPI, the CQI, the PMI and at least one of the SPN or the RI.

10. The apparatus of claim 9, wherein the controller is configured to determine the SPN as the number of CSI-RS ports to select based on at least one of the calculated CQI values or a grouping of the CSI-RS ports.

11. The apparatus of claim 9, wherein:
    when the SPN and the SPI are calculated by the UE, the controller is configured to select a number of CSI-RS ports whose signal power exceeds a threshold, select a number of CSI-RS ports whose total sum power exceed a threshold, or select a number of CSI-RS ports where each port is from a group of CSI-RS ports and received power exceed a threshold, the controller is configured to calculate the CQI values based on the selected SPN and the SPI, and the threshold is determined by the UE or configured by a base station.

12. The apparatus of claim 9, wherein:

the controller is configured to calculate the CQI values based on each of the plurality of the CSI-RS ports selection and select the CQI/PMI/USPN/SPI associated with a particular CQI, or calculate the CQI values based on each of the plurality of possible combinations of CSI-RS ports whose received power exceeds the threshold and select the CQI/PMI/SPN/SPI associated with the highest CQI value, and the threshold is determined by the UE or configured by a base station.

13. The apparatus of claim 9, wherein when the SPN is configured for the UE, the controller is configured to select the number of the CSI-RS ports according to a value of the SPN configured for the UE.

14. The apparatus of claim 9, wherein when SPN/SPI sets are configured for the UE, the controller is configured to select a SPN/SPI set from the configured SPN/SPI sets based on the calculated CQI values.

15. The apparatus of claim 9, wherein the transmitter is configured to send the feedback including the SPN and the SPI for each of the selected CSI-RS ports.

16. The apparatus of claim 9, wherein:

the controller is configured to control joint encoding of the SPN and the SPI according to a selected port number and index (SPNI) index;

the transmitter is configured to send the feedback including the SPNI index; and the SPN is fed back implicitly based on the SPN being equal to the RI.

* * * * *